(12) United States Patent
Vandal et al.

(10) Patent No.: US 10,047,885 B2
(45) Date of Patent: *Aug. 14, 2018

(54) SLIP ON GROOVE COUPLING WITH MULTIPLE SEALING GASKET

(71) Applicant: Anvil International, LLC, Exeter, NH (US)

(72) Inventors: Peter Joseph Vandal, Providence, RI (US); Douglas Compton, Headland, AL (US)

(73) Assignee: Anvil International, LLC, Exeter, NH (US)

(*) Notice: Subject to any disclaimer, the term of this patent is extended or adjusted under 35 U.S.C. 154(b) by 27 days.

This patent is subject to a terminal disclaimer.

(21) Appl. No.: 14/837,475

(22) Filed: Aug. 27, 2015

(65) Prior Publication Data

US 2015/0369405 A1    Dec. 24, 2015

Related U.S. Application Data

(63) Continuation of application No. 14/019,182, filed on Sep. 5, 2013, now Pat. No. 9,239,123, which is a
(Continued)

(51) Int. Cl.
| | |
|---|---|
| F16L 17/00 | (2006.01) |
| F16L 21/02 | (2006.01) |
| F16L 17/04 | (2006.01) |
| F16L 21/06 | (2006.01) |
| B23P 19/04 | (2006.01) |

(Continued)

(52) U.S. Cl.
CPC .............. F16L 21/02 (2013.01); B23P 19/04 (2013.01); F16J 15/022 (2013.01); F16L 17/04 (2013.01); F16L 21/03 (2013.01); F16L 21/06 (2013.01); F16L 21/065 (2013.01); B33Y 70/00 (2014.12); B33Y 80/00 (2014.12);
(Continued)

(58) Field of Classification Search
CPC . F16L 21/02; F16L 17/04; F16L 21/06; F16L 21/065
USPC ........ 285/112, 367, 111, 110, 366, 365, 364, 285/23, 411
See application file for complete search history.

(56) References Cited

U.S. PATENT DOCUMENTS

| 29,731 A | 8/1860 | Truss |
|---|---|---|
| 815,581 A | 3/1906 | Dean |

(Continued)

FOREIGN PATENT DOCUMENTS

| DE | 1051585 | 2/1959 |
|---|---|---|
| DE | 972484 | 7/1959 |

(Continued)

OTHER PUBLICATIONS

Vandal, Peter Joseph; Issue Notification for U.S. Appl. No. 14/019,182, filed Sep. 5, 2013, dated Oct. 28, 2015, 1 pg.
(Continued)

*Primary Examiner* — David Bochna
(74) *Attorney, Agent, or Firm* — Taylor English Duma LLP

(57) ABSTRACT

Couplings and gaskets are disclosed. Couplings may include an upper housing, a lower housing, at least one fastening device coupling the upper housing to the lower housing, and a gasket positioned within the upper and lower housings, the gasket including two primary seals and a rib protruding from an inner surface of the gasket and between the two primary seals.

6 Claims, 11 Drawing Sheets

Related U.S. Application Data continuation of application No. 13/554,721, filed on Jul. 20, 2012, now Pat. No. 8,550,502, which is a continuation of application No. 12/490,113, filed on Jun. 23, 2009, now Pat. No. 8,282,136.

(60) Provisional application No. 61/133,300, filed on Jun. 30, 2008.

(51) Int. Cl.
  *F16J 15/02* (2006.01)
  *F16L 21/03* (2006.01)
  *B33Y 70/00* (2015.01)
  *B33Y 80/00* (2015.01)

(52) U.S. Cl.
  CPC .... Y10T 29/49826 (2015.01); Y10T 29/49872 (2015.01); Y10T 137/0447 (2015.04)

(56) References Cited

U.S. PATENT DOCUMENTS

| | | |
|---|---|---|
| 1,006,294 A | 10/1911 | Schubart |
| 1,093,868 A | 4/1914 | Leighty |
| 1,352,918 A | 9/1920 | Rohbock |
| 1,541,601 A | 6/1925 | Tribe |
| 1,851,574 A | 3/1929 | Fiederlein |
| 1,930,194 A | 10/1930 | Dillon |
| 1,833,776 A | 11/1931 | Dillon |
| 1,867,891 A | 7/1932 | Baillie |
| 1,881,508 A | 10/1932 | Gredell |
| 1,937,881 A | 12/1933 | Fisher |
| 1,970,078 A | 8/1934 | Dillon |
| 1,987,235 A | 1/1935 | Janeway |
| 2,020,156 A | 11/1935 | Muchnic |
| 2,041,132 A | 5/1936 | Johnson |
| 2,369,770 A | 2/1945 | Baxter |
| 2,377,510 A | 6/1945 | Newell |
| 2,439,979 A | 4/1948 | Krooss |
| 2,449,795 A | 9/1948 | Sillwagon |
| 2,456,048 A | 12/1948 | Carpenter |
| 2,473,046 A | 6/1949 | Adams |
| 2,473,102 A | 6/1949 | Krooss |
| 2,486,120 A | 10/1949 | Colton et al. |
| 2,616,946 A | 11/1952 | Scheer |
| 2,675,253 A | 4/1954 | Stade |
| 2,688,170 A | 9/1954 | Balzer |
| 2,688,500 A | 9/1954 | Scott |
| 2,752,173 A | 6/1956 | Krooss |
| 2,754,136 A | 7/1956 | Newton |
| 2,816,780 A | 12/1957 | Ross |
| 2,821,415 A | 1/1958 | Race |
| 2,944,839 A | 7/1960 | Anderson |
| 2,950,930 A | 8/1960 | Dunmire |
| 2,962,305 A | 11/1960 | McCarthy et al. |
| 3,003,793 A | 10/1961 | Pitt |
| 3,004,781 A | 10/1961 | Morris |
| 3,014,259 A | 12/1961 | Joseph |
| 3,015,502 A | 1/1962 | Frost et al. |
| 3,024,046 A | 3/1962 | Frost et al. |
| 3,054,629 A | 9/1962 | Piatek |
| D196,724 S | 10/1963 | Davis |
| 3,107,108 A | 10/1963 | Greene |
| 3,134,612 A | 5/1964 | Glasgow |
| 3,135,154 A | 6/1964 | Zenzic |
| 3,153,550 A | 10/1964 | Hollett |
| 3,176,723 A | 4/1965 | Hodgeman et al. |
| 3,181,896 A | 5/1965 | Russell |
| 3,189,969 A | 6/1965 | Sweet |
| 3,201,149 A | 8/1965 | Bragg |
| 3,207,538 A | 9/1965 | Pattillo |
| 3,213,817 A | 10/1965 | Kish |
| 3,251,615 A | 5/1966 | Short, III |
| 3,283,553 A | 11/1966 | Taylor |
| 3,285,568 A | 11/1966 | Biach |
| 3,291,506 A | 12/1966 | Blakeley |
| 3,298,698 A | 1/1967 | Condon |
| 3,313,197 A | 4/1967 | Knohl |
| 3,315,970 A | 4/1967 | Holoway |
| 3,329,446 A | 7/1967 | Katis et al. |
| 3,351,352 A | 11/1967 | Blakeley et al. |
| 3,362,730 A | 1/1968 | St. Clair et al. |
| 3,386,771 A | 6/1968 | Verdier et al. |
| 3,425,473 A | 2/1969 | Knowlton |
| 3,464,722 A | 9/1969 | Larkin |
| 3,524,662 A | 8/1970 | Tolman et al. |
| 3,550,638 A | 12/1970 | Smith |
| 3,658,367 A | 4/1972 | Pfeuffer |
| 3,664,691 A | 5/1972 | Nakamura |
| 3,680,619 A | 8/1972 | Sparks |
| 3,680,894 A | 8/1972 | Young |
| 3,695,638 A | 10/1972 | Blakeley |
| RE27,736 E | 8/1973 | Muhlner et al. |
| 3,794,361 A | 2/1974 | Westberg |
| 3,797,078 A | 3/1974 | LaPointe |
| 3,807,435 A | 4/1974 | Fenster et al. |
| 3,856,245 A | 12/1974 | Byerly |
| 3,877,733 A | 4/1975 | Straub |
| 3,905,623 A | 9/1975 | Cassel |
| 3,966,237 A | 6/1976 | Thiessen |
| 3,977,705 A | 8/1976 | Thiessen et al. |
| 4,034,788 A | 7/1977 | Melone |
| 4,064,921 A | 12/1977 | Kose |
| 4,108,479 A | 8/1978 | Straub |
| 4,109,941 A | 8/1978 | Wood et al. |
| 4,111,234 A | 9/1978 | Wells et al. |
| 4,114,414 A | 9/1978 | Goodman |
| 4,131,302 A | 12/1978 | Leonard, Jr. |
| 4,137,610 A | 2/1979 | Hoen |
| 4,176,865 A | 12/1979 | Felton et al. |
| D256,046 S | 7/1980 | Perrin |
| 4,258,361 A | 3/1981 | Hydes et al. |
| 4,258,941 A | 3/1981 | Sands |
| 4,304,415 A | 12/1981 | Wolf et al. |
| 4,311,248 A | 1/1982 | Westerlund et al. |
| 4,326,737 A | 4/1982 | Lehmann |
| 4,350,350 A | 9/1982 | Blakeley |
| 4,377,894 A | 3/1983 | Yoshida |
| 4,391,458 A | 7/1983 | Blakeley |
| 4,403,378 A | 9/1983 | Engman |
| 4,408,788 A | 10/1983 | Beukema |
| 4,417,755 A | 11/1983 | Gittleman |
| 4,432,558 A | 2/1984 | Westerlund et al. |
| 4,438,958 A | 3/1984 | De Cenzo |
| 4,445,533 A | 5/1984 | DeFrees |
| 4,471,979 A | 9/1984 | Gibb et al. |
| 4,480,861 A | 11/1984 | Cann, Jr. |
| 4,506,418 A | 3/1985 | Viola et al. |
| 4,518,177 A | 5/1985 | Deakins |
| 4,522,433 A | 6/1985 | Valentine et al. |
| 4,522,434 A | 6/1985 | Webb |
| 4,568,115 A | 2/1986 | Zimmerly |
| 4,601,495 A | 7/1986 | Webb |
| 4,611,839 A | 9/1986 | Rung et al. |
| 4,616,858 A | 10/1986 | Sauer |
| 4,629,217 A | 12/1986 | Straub |
| 4,639,020 A | 1/1987 | Rung et al. |
| 4,643,461 A | 2/1987 | Thau, Jr. |
| D289,078 S | 3/1987 | Vassallo et al. |
| 4,664,422 A | 5/1987 | Straub |
| 4,702,499 A | 10/1987 | DeRaymond et al. |
| 4,702,500 A | 10/1987 | Thau, Jr. et al. |
| 4,717,299 A | 1/1988 | Underwood |
| 4,722,561 A | 2/1988 | Heckelthorn et al. |
| 4,726,611 A | 2/1988 | Sauer |
| 4,739,542 A | 4/1988 | Krzesicki |
| 4,776,362 A | 10/1988 | Domingue, Sr. et al. |
| 4,861,075 A | 8/1989 | Pepi et al. |
| 4,893,843 A | 1/1990 | DeRaymond |
| 4,896,902 A | 1/1990 | Weston |
| 4,915,418 A | 4/1990 | Palatchy |
| 4,966,395 A | 10/1990 | Hendrickson |
| 5,018,548 A | 5/1991 | McLennan |
| 5,037,141 A | 8/1991 | Jardine |

(56) References Cited

U.S. PATENT DOCUMENTS

| | | |
|---|---|---|
| 5,039,137 A | 8/1991 | Cankovic et al. |
| 5,056,833 A | 10/1991 | Webb et al. |
| 5,058,931 A | 10/1991 | Bowsher |
| 5,080,400 A | 1/1992 | Adamek et al. |
| 5,094,492 A | 3/1992 | Levivier |
| 5,104,153 A | 4/1992 | Corcoran |
| 5,137,305 A | 8/1992 | Straub |
| 5,190,324 A | 3/1993 | Bird et al. |
| 5,203,594 A | 4/1993 | Straub |
| 5,230,537 A | 7/1993 | Newman |
| 5,230,540 A | 7/1993 | Lewis et al. |
| 5,240,294 A | 8/1993 | Corcoran |
| 5,246,256 A | 9/1993 | Rung et al. |
| 5,246,257 A | 9/1993 | Kojima et al. |
| 5,248,169 A | 9/1993 | Barbe et al. |
| 5,249,829 A | 10/1993 | Hendrickson |
| 5,273,322 A | 12/1993 | Straub |
| 5,280,969 A | 1/1994 | Straub |
| 5,280,970 A | 1/1994 | Straub |
| 5,291,769 A | 3/1994 | Miyano |
| 5,301,986 A | 4/1994 | Yehezkeli |
| 5,306,021 A | 4/1994 | Morvant |
| 5,312,137 A | 5/1994 | Nee |
| 5,351,997 A | 10/1994 | Webb et al. |
| 5,354,108 A | 10/1994 | Sandor |
| 5,387,017 A | 2/1995 | Gill |
| 5,450,738 A | 9/1995 | Chatterley et al. |
| 5,508,931 A | 4/1996 | Snider |
| 5,509,702 A | 4/1996 | Warehime et al. |
| 5,560,656 A | 10/1996 | Okamura et al. |
| 5,603,508 A | 2/1997 | Dole et al. |
| 5,651,588 A | 7/1997 | Kato |
| 5,658,021 A | 8/1997 | Matsumoto et al. |
| 5,697,650 A | 12/1997 | Brown |
| 5,758,906 A | 6/1998 | Carlstrom et al. |
| 5,758,907 A | 6/1998 | Dole et al. |
| 5,772,257 A | 6/1998 | Webb et al. |
| 5,778,715 A | 7/1998 | Lippka et al. |
| 5,845,384 A | 12/1998 | Retzbach |
| 5,873,611 A | 2/1999 | Munley et al. |
| 5,899,507 A | 5/1999 | Schroeder et al. |
| 5,901,601 A | 5/1999 | Fujimoto et al. |
| 5,911,446 A | 6/1999 | McLennan et al. |
| 5,971,001 A | 10/1999 | Andersson |
| 6,070,911 A | 6/2000 | Namikawa et al. |
| 6,070,914 A | 6/2000 | Schmidt |
| 6,076,861 A | 6/2000 | Ikeda |
| 6,139,069 A | 10/2000 | Radzik |
| 6,142,536 A | 11/2000 | Wolfsdorf |
| 6,170,884 B1 | 1/2001 | McLennan et al. |
| 6,171,039 B1 | 1/2001 | Seurujarvi |
| 6,206,434 B1 | 3/2001 | Schreiter |
| 6,227,577 B1 | 5/2001 | Ikeda et al. |
| 6,231,286 B1 | 10/2001 | Bogatz et al. |
| 6,302,450 B1 | 10/2001 | Dole et al. |
| 6,305,719 B1 | 10/2001 | Smith, Jr. et al. |
| 6,312,025 B1 | 11/2001 | Wolfsdorf |
| 6,328,352 B1 | 12/2001 | Geppert et al. |
| 6,361,085 B2 | 3/2002 | Nguyen |
| 6,367,843 B1 | 4/2002 | Fetzer |
| 6,371,491 B1 | 4/2002 | Schultz et al. |
| 6,393,885 B1 | 5/2002 | Cadena |
| 6,481,762 B1 | 11/2002 | Rex et al. |
| 6,502,865 B1 | 1/2003 | Steele |
| 6,533,333 B1 | 3/2003 | Radzik |
| 6,565,129 B2 | 5/2003 | Surjaatmadja |
| 6,581,977 B1 | 6/2003 | Dole et al. |
| 6,619,094 B2 | 9/2003 | Juhl |
| 6,626,466 B1 | 9/2003 | Dole |
| 6,749,232 B2 | 6/2004 | Wachter et al. |
| 6,758,500 B2 | 7/2004 | Lehnhardt |
| 6,758,501 B2 | 7/2004 | Amedure et al. |
| 6,769,697 B1 | 8/2004 | Ishikawa et al. |
| 6,834,892 B2 | 12/2004 | Kornau et al. |
| 6,880,859 B2 | 4/2005 | Breay et al. |
| 6,908,123 B2 | 6/2005 | Le |
| 6,969,094 B2 | 11/2005 | Frohling et al. |
| D526,705 S | 8/2006 | Wortmann et al. |
| 7,086,131 B2 | 8/2006 | Gibb et al. |
| 7,090,259 B2 | 8/2006 | Dole |
| 7,118,317 B2 | 10/2006 | Hofschneider |
| 7,243,955 B2 | 7/2007 | Krausz et al. |
| 7,341,287 B2 | 3/2008 | Gibb et al. |
| D570,458 S | 6/2008 | Gibb et al. |
| 7,401,819 B2 | 7/2008 | Gibb et al. |
| 7,533,910 B2 | 5/2009 | Ma et al. |
| D598,988 S | 8/2009 | Jacoby |
| D600,325 S | 9/2009 | Porter et al. |
| 7,591,055 B2 | 9/2009 | Gibb et al. |
| D605,736 S | 12/2009 | Porter et al. |
| D609,312 S | 2/2010 | Porter et al. |
| 7,654,587 B2 | 2/2010 | Gibb et al. |
| D611,126 S | 3/2010 | Porter et al. |
| D614,272 S | 4/2010 | Henry et al. |
| 7,690,698 B1 | 4/2010 | Curran |
| D616,532 S | 5/2010 | Madara et al. |
| 7,712,796 B2 | 5/2010 | Gibb et al. |
| 7,722,087 B2 | 5/2010 | Dole et al. |
| D618,312 S | 6/2010 | Madara et al. |
| D618,313 S | 6/2010 | Madara et al. |
| D618,314 S | 6/2010 | Bowman et al. |
| D618,315 S | 6/2010 | Bowman et al. |
| 7,726,703 B2 | 6/2010 | Porter et al. |
| 7,789,434 B2 | 9/2010 | Nagle et al. |
| D625,785 S | 10/2010 | Madara et al. |
| D625,786 S | 10/2010 | Bowman et al. |
| D625,787 S | 10/2010 | Bowman et al. |
| D625,788 S | 10/2010 | Madara et al. |
| D626,201 S | 10/2010 | Madara et al. |
| 7,818,869 B2 | 10/2010 | Dole et al. |
| D629,078 S | 12/2010 | Dole et al. |
| D629,079 S | 12/2010 | Dole et al. |
| D629,080 S | 12/2010 | Dole et al. |
| D629,081 S | 12/2010 | Dole et al. |
| D629,496 S | 12/2010 | Madara et al. |
| D633,991 S | 3/2011 | Nakagawa |
| 7,921,536 B2 | 4/2011 | Dole |
| 7,950,701 B2 | 5/2011 | Dole et al. |
| D643,912 S | 8/2011 | Bowman et al. |
| D646,764 S | 10/2011 | Rusconi |
| 8,038,176 B2 | 10/2011 | Bowman et al. |
| D648,427 S | 11/2011 | Bowman |
| D651,290 S | 12/2011 | Shah et al. |
| 8,069,547 B2 | 12/2011 | Gibb et al. |
| 8,079,129 B2 | 12/2011 | Gibb et al. |
| 8,136,847 B2 | 3/2012 | Madara et al. |
| 8,177,263 B2 | 5/2012 | Dole et al. |
| D665,056 S | 8/2012 | Cuvo et al. |
| D665,057 S | 8/2012 | Madara et al. |
| D665,058 S | 8/2012 | Cuvo et al. |
| D665,059 S | 8/2012 | Madara et al. |
| D665,060 S | 8/2012 | Wilk, Jr. et al. |
| D665,061 S | 8/2012 | Dole et al. |
| D665,888 S | 8/2012 | Wilk, Jr. et al. |
| D665,889 S | 8/2012 | Dole et al. |
| 8,267,432 B2 | 9/2012 | Madara et al. |
| 8,282,136 B2 | 10/2012 | Vandal et al. |
| 8,312,616 B2 | 11/2012 | Dole et al. |
| D680,629 S | 4/2013 | Beagan, Jr. |
| D680,630 S | 4/2013 | Beagan, Jr. |
| 8,424,918 B2 | 4/2013 | Gibb et al. |
| 8,550,502 B2 | 10/2013 | Vandal et al. |
| D696,751 S | 12/2013 | Beagen, Jr. |
| 8,615,865 B2 | 12/2013 | Vandal et al. |
| 8,819,914 B2 | 9/2014 | Porter et al. |
| 9,039,046 B2 | 5/2015 | Beagen, Jr. |
| 9,168,585 B2 | 10/2015 | Schell |
| 9,194,516 B2 | 11/2015 | Beagen, Jr. |
| 9,239,123 B2 | 1/2016 | Vandal |
| 9,297,482 B2 | 3/2016 | Vandal et al. |
| 9,297,484 B2 | 3/2016 | Beagen, Jr. |
| 9,500,307 B2 | 11/2016 | Beagen, Jr. |
| 9,534,715 B2 | 1/2017 | Beagen, Jr. |
| 9,631,746 B2 | 4/2017 | Beagen |

(56) References Cited

U.S. PATENT DOCUMENTS

| | | |
|---|---|---|
| 2002/0171244 A1 | 11/2002 | Wachter et al. |
| 2002/0195820 A1 | 12/2002 | Surjaatmadja |
| 2003/0062718 A1 | 4/2003 | Radzik |
| 2003/0178850 A1 | 9/2003 | Dole et al. |
| 2003/0234541 A1 | 12/2003 | Thompson |
| 2004/0036291 A1 | 2/2004 | Dole |
| 2005/0082831 A1 | 4/2005 | Borland |
| 2005/0212284 A1 | 9/2005 | Dole |
| 2005/0225087 A1 | 10/2005 | McMahon et al. |
| 2005/0253380 A1 | 11/2005 | Gibb et al. |
| 2005/0253382 A1 | 11/2005 | Gibb et al. |
| 2005/0253383 A1 | 11/2005 | Gibb et al. |
| 2005/0258641 A1 | 11/2005 | Gibb |
| 2007/0040336 A1 | 2/2007 | Sun et al. |
| 2007/0090646 A1 | 4/2007 | Dole et al. |
| 2008/0007061 A1 | 1/2008 | Gibb |
| 2008/0018057 A1 | 1/2008 | Gibb et al. |
| 2008/0048444 A1 | 2/2008 | Porter et al. |
| 2008/0272595 A1 | 11/2008 | Gibb et al. |
| 2008/0284159 A1 | 11/2008 | Krehl |
| 2008/0290652 A1 | 11/2008 | Gibb et al. |
| 2009/0146417 A1 | 6/2009 | Lippka et al. |
| 2009/0206598 A1 | 8/2009 | Gibb et al. |
| 2009/0223031 A1 | 9/2009 | Gibb et al. |
| 2009/0243291 A1 | 10/2009 | Gibb et al. |
| 2010/0001521 A1 | 1/2010 | Vandal et al. |
| 2010/0102549 A1 | 4/2010 | Radzik |
| 2010/0148493 A1 | 6/2010 | Madara et al. |
| 2010/0187812 A1 | 7/2010 | Radzik et al. |
| 2010/0218362 A1 | 9/2010 | Porter et al. |
| 2010/0289257 A1 | 11/2010 | Madara et al. |
| 2010/0320756 A1 | 12/2010 | Gibb et al. |
| 2011/0037250 A1 | 2/2011 | Bowman et al. |
| 2011/0062706 A1 | 3/2011 | Henry |
| 2011/0133415 A1 | 6/2011 | Vu |
| 2011/0154646 A1 | 6/2011 | Hagiya |
| 2012/0256415 A1 | 4/2012 | Dole |
| 2012/0139236 A1 | 6/2012 | Novitsky et al. |
| 2012/0235405 A1 | 9/2012 | Dole et al. |
| 2012/0248767 A1 | 10/2012 | Lippka |
| 2012/0256416 A1 | 10/2012 | Ikeda et al. |
| 2012/0280494 A1 | 11/2012 | Vandal et al. |
| 2013/0185919 A1 | 7/2013 | Beagan, Jr. |
| 2013/0187345 A1 | 7/2013 | Beagan, Jr. |
| 2013/0187346 A1 | 7/2013 | Beagan, Jr. |
| 2013/0187379 A1 | 7/2013 | Beagan, Jr. |
| 2015/0020371 A1 | 1/2015 | Beagen, Jr. |
| 2017/0016560 A1 | 1/2017 | Beagen |
| 2017/0074433 A1 | 3/2017 | Beagen |
| 2017/0184233 A1 | 6/2017 | Beagen |

FOREIGN PATENT DOCUMENTS

| | | |
|---|---|---|
| DE | 1205348 | 11/1965 |
| DE | 1798281 | 9/1971 |
| DE | 2911575 | 9/1980 |
| DE | 2950521 | 10/1980 |
| DE | 3038491 | 4/1982 |
| DE | 9103296 | 6/1991 |
| DE | 4309330 | 9/1994 |
| DE | 4427513 | 2/1996 |
| DE | 19534437 | 3/1997 |
| DE | 10006029 | 8/2001 |
| DE | 10230845 | 2/2003 |
| DK | 108514 | 12/1967 |
| EP | 0079457 | 5/1983 |
| EP | 0178360 | 4/1986 |
| EP | 0205896 | 12/1986 |
| EP | 0360946 | 4/1990 |
| EP | 0361765 | 4/1990 |
| EP | 0386516 | 9/1990 |
| EP | 0396151 | 11/1990 |
| EP | 0412642 | 2/1991 |
| EP | 0427880 | 5/1991 |
| EP | 0463424 | 1/1992 |
| EP | 0531833 | 3/1993 |
| EP | 1180630 | 2/2002 |
| EP | 1260751 | 11/2002 |
| ES | 2172374 | 9/2002 |
| FR | 1138312 | 6/1957 |
| FR | 2761452 | 10/1998 |
| GB | 343781 | 2/1931 |
| GB | 458441 | 12/1936 |
| GB | 822025 | 10/1959 |
| GB | 1019322 | 2/1966 |
| GB | 1322269 | 7/1973 |
| GB | 1331236 | 9/1973 |
| GB | 1489488 | 10/1977 |
| GB | 2051213 | 1/1981 |
| GB | 2098297 | 11/1982 |
| GB | 2123904 | 2/1984 |
| GB | 2143294 | 2/1985 |
| GB | 2157785 | 10/1985 |
| GB | 2161882 | 1/1986 |
| GB | 2211255 | 6/1989 |
| GB | 2218768 | 11/1989 |
| GB | 2243659 | 11/1991 |
| GB | 2253451 | 9/1992 |
| GB | 2253452 | 9/1992 |
| GB | 2349189 | 10/2000 |
| GB | 2367871 | 4/2002 |
| JP | H427287 | 6/1990 |
| JP | H4117978 | 4/1991 |
| JP | H1154390 | 2/1999 |
| JP | 2000257767 | 9/2000 |
| JP | 2003074772 | 3/2003 |
| JP | 2007278455 | 10/2007 |
| KR | 1019980012486 | 4/1998 |
| KR | 1019980025273 | 7/1998 |
| KR | 1020050121743 | 12/2005 |
| SE | 8704187 | 4/1989 |
| WO | 9317268 | 9/1993 |
| WO | 9511402 | 4/1995 |
| WO | 9843010 | 10/1998 |
| WO | 0057093 | 9/2000 |
| WO | 0077435 | 12/2000 |
| WO | 0159350 | 8/2001 |
| WO | 03029712 | 4/2003 |
| WO | 2005114024 | 12/2005 |
| WO | 07145995 | 12/2007 |
| WO | 08104792 | 4/2008 |

OTHER PUBLICATIONS

Vandal, Peter Joseph; Issue Notification for U.S. Appl. No. 14/019,182, filed Sep. 5, 2013, dated Dec. 29, 2015, 1 pg.

Vandal, Peter Joseph; Notice of Allowance for U.S. Appl. No. 14/019,182, filed Sep. 5, 2013, dated Nov. 18, 2015, 12 pgs.

Vandal, Peter Joseph; Non-Final Office Action for U.S. Appl. No. 14/677,490, filed Apr. 2, 2015, dated Nov. 2, 2015, 76 pgs.

Beagen, Joseph William; Issue Notification for U.S. Appl. No. 13/354,459, filed Jan. 20, 2012, dated Nov. 4, 2015, 1 pg.

Beagen, Joseph William; Notice of Allowance for U.S. Appl. No. 14/741,665, filed Jun. 17, 2015, dated Dec. 7, 2015, 7 pgs.

Beagen Jr., Joseph W.; Non-Final Office Action for U.S. Appl. No. 14/506,307, filed Oct. 3, 2014, dated Dec. 18, 2015, 80 pgs.

Beagen Jr., Joseph William; Applicant Interview Summary for U.S. Appl. No. 13/354,470, filed Jan. 20, 2012, dated Dec. 29, 2015, 3 pgs.

Beagen Jr., Joseph William; Non-Final Office Action for U.S. Appl. No. 13/354,470, filed Jan. 20, 2012, dated Nov. 13, 2015, 28 pgs.

Vandal, Peter Joseph; Issue Notification for U.S. Appl. No. 14/677,507, filed Apr. 2, 2015, dated Mar. 9, 2016, 1 pg.

Vandal, Peter Joseph; Notice of Allowance for U.S. Appl. No. 14/677,507, filed Apr. 2, 2015, dated Feb. 2, 2016, 14 pgs.

Vandal, Peter Joseph; Final Office Action for U.S. Appl. No. 14/677,490, filed Apr. 2, 2015, dated Mar. 8, 2016, 13 pgs.

Beagen, Joseph William; Issue Notification for U.S. Appl. No. 14/741,665, filed Jun. 17, 2015, dated Mar. 9, 2016, 1 pg.

Beagen Jr., Joseph W.; Applicant Interview Summary for U.S. Appl. No. 14/506,307, filed Oct. 3, 2014, dated Feb. 2, 2016, 3 pgs.

(56) References Cited

OTHER PUBLICATIONS

Beagen Jr., Joseph William; Final Office Action for U.S. Appl. No. 13/354,466, filed Jan. 20, 2012, dated Feb. 2, 2016, 22 pgs.
Beagen, Joseph William; Advisory Action for U.S. Appl. No. 13/354,466, filed Jan. 20, 2012, dated Mar. 17, 2016, 5 pgs.
Beagen Jr., Joseph W.; Final Office Action for U.S. Appl. No. 14/506,307, filed Oct. 3, 2014, dated May 12, 2016, 22 pgs.
Beagen Jr., Joseph William; Applicant Interview Summary for U.S. Appl. No. 13/354,470, filed Jan. 20, 2012, dated Apr. 21, 2016, 3 pgs.
Beagen Jr., Joseph William; Final Office Action for U.S. Appl. No. 13/354,470, filed Jan. 20, 2012, dated Jan. 6, 2016, 28 pgs.
Beagen, Jr., Joseph William; Non-Final Office Action for U.S. Appl. No. 14/506,307, filed Oct. 3, 2014, dated Aug. 29, 2016; 19 pgs.
Beagen, Jr., Joseph William; Notice of Allowance for U.S. Appl. No. 13/354,466, filed Jan. 2, 2012, dated Mar. 25, 2016, 21 pgs.
Beagen Jr., Joseph William; Notice of Allowance for U.S. Appl. No. 13/354,470, filed Jan. 20, 2012, dated May 29, 2016, 13 pgs.
Beagen Jr, Joseph William; Applicant Initiated Interview Summary for U.S. Appl. No. 14/506,307, filed Oct. 3, 2014, dated Oct. 31, 2016; 3 pgs.
Beagen, Jr.; Joseph William; Corrected Notice of Allowability for U.S. Appl. No. 13/354,466, filed Jan. 20, 2012, dated Oct. 4, 2016, 7 pgs.
Beagen, Jr.; Joseph William; Corrected Notice of Allowability for U.S. Appl. No. 13/354,466, filed Jan. 20, 2012, dated Dec. 6, 2016, 6 pgs.
Beagen, Jr.; Joseph William; Issue Notification for U.S. Appl. No. 13/354,466, filed Jan. 20, 2012, dated Dec. 14, 2016, 1 pg.
Beagen Jr., Joseph William; Corrected Notice of Allowability for U.S. Appl. No. 13/354,470, filed Jan. 20, 2012, dated Oct. 24, 2016, 6 pgs.
Beagen Jr., Joseph William; Issue Notification for U.S. Appl. No. 13/354,470, filed Jan. 20, 2012, dated Nov. 2, 2016, 1 pg.
Vandal; Issue Notification for U.S. Appl. No. 12/490,113, filed Jun. 23, 2009, dated Sep. 19, 2012; 1 pg.
Vandal; Non-Final Office Action for U.S. Appl. No. 12/490,113, filed Jun. 23, 2009, dated Dec. 8, 2011, 13 pages.
Vandal; Notice of Allowance for U.S. Appl. No. 12/490,113, filed Jun. 23, 2009, dated Feb. 29, 2012; 39 pgs.
Vandal; Notice of Allowance for U.S. Appl. No. 12/490,113, filed Jun. 23, 2009, dated Apr. 16, 2012; 6 pgs.
Vandal; Notice of Allowance for U.S. Appl. No. 12/490,113, filed Jun. 23, 2009, dated May 31, 2012; 9 pgs.
Vandal; Restriction Requirement for U.S. Appl. No. 12/490,113, filed Jun. 23, 2009, dated Oct. 26, 2011; 5 pgs.
Vandal; U.S. Patent Application Entitled: Slip on Groove Coupling with Multiple Sealing Gasket; U.S. Appl. No. 12/490,113, filed Jun. 23, 2009; 33 pgs.
Vandal, Peter Joseph; Non-Final Office Action for U.S. Appl. No. 13/554,721, filed Jul. 20, 2012, dated Feb. 5, 2013; 54 pgs.
Vandal, Peter Joseph; Notice of Allowance for U.S. Appl. No. 13/554,721, filed Jul. 20, 2012, dated Aug. 6, 2013, 18 pgs.
Vandal, Peter Joseph; U.S. Patent Application entitled: Slip on Groove Coupling with Multiple Sealing Gasket, having U.S. Appl. No. 13/554,721, filed Jul. 20, 2012, 29 pgs.
Vandal, Peter Jospeh; Issue Notification for U.S. Appl. No. 13/554,721, filed Jul. 20, 2012, dated Sep. 18, 2013, 1 pg.
Vandal, Peter Joseph; Advisory Action for U.S. Appl. No. 14/019,182, filed Sep. 5, 2013, dated Jun. 23, 2014, 3 pgs.
Vandal, Peter Joseph; Final Office Action for U.S. Appl. No. 14/019,182, filed Sep. 5, 2013, dated Apr. 8, 2014, 28 pgs.
Vandal, Peter Joseph; Final Office Action for U.S. Appl. No. 14/019,182, filed Sep. 5, 2013, dated Jul. 11, 2014, 11 pgs.
Vandal, Peter Joseph; Final Office Action for U.S. Appl. No. 14/019,182, filed Sep. 5, 2013, dated Oct. 24, 2014, 11 pgs.
Vandal, Peter Joseph; Non-Final Office Action for U.S. Appl. No. 14/019,182, filed Sep. 5, 2013, dated Nov. 12, 2013, 54 pgs.
Vandal, Peter Joseph; Non-Final Office Action for U.S. Appl. No. 14/019,182, filed Sep. 5, 2013, dated Mar. 23, 2015, 12 pgs.
Vandal, Peter Joseph; Notice of Allowance for U.S. Appl. No. 14/019,182, filed Sep. 5, 2013, dated Jun. 1, 2015, 10 pgs.
Vandal, Peter Joseph; U.S. Patent Application entitled: Slip on Groove Coupling with Multiple Sealing Gasket, having U.S. Appl. No. 14/019,182, filed Sep. 5, 2013, 29 pgs.
Vandal, Peter Joseph; Non-Final Office Action for U.S. Appl. No. 14/677,507, filed Apr. 2, 2015, dated Jul. 30, 2015, 73 pgs.
Vandal, Peter Joseph; U.S. Patent Application entitled: Slip on Groove Coupling With Multiple Sealing Gasket having U.S. Appl. No. 14/677,507, filed Apr. 2, 2015, 29 pgs.
Vandal, et al.; U.S. Divisional Patent Application entitled: Slip on Groove Coupling With Multiple Sealing Gasket filed under U.S. Appl. No. 13/300,718, filed Nov. 21, 2011, 29 pgs.
Vandal, Peter Joseph; Issue Notification for U.S. Appl. No. 13/300,718, filed Nov. 21, 2011, dated Dec. 11, 2013, 1 pg.
Vandal, Peter Joseph; Non-Final Office Action for U.S. Appl. No. 13/300,718, filed Nov. 21, 2011, dated May 30, 2013; 59 pgs.
Vandal, Peter Joseph; Notice of Allowance for U.S. Appl. No. 13/300,718, filed Nov. 21, 2011, dated Oct. 15, 2013; 14 pgs.
Vandal, Peter Joseph; Supplemental Notice of Allowance for U.S. Appl. No. 13/300,718, filed Nov. 21, 2011, dated Dec. 4, 2013; 8 pgs.
Vandal; International Search Report and Written Opinion for serial No. PCT/US09/48291, filed Jun. 23, 2009, dated Apr. 2, 2010; 11 pages.
Vandal, Peter Joseph; Examiner's Answer to Appeal Brief for U.S. Appl. No. 14/088,865, filed Nov. 25, 2013, dated Jun. 24, 2015, 24 pgs.
Vandal, Peter Joseph; Final Office Action for U.S. Appl. No. 14/088,865, filed Nov. 25, 2013, dated Nov. 24, 2014, 11 pgs.
Vandal, Peter Joseph; Non-Final Office Action for U.S. Appl. No. 14/088,865, filed Nov. 25, 2013, dated Aug. 14, 2014, 69 pgs.
Vandal, Peter Joseph; US Patent Application entitled: Slip on Groove Coupling With Multiple Sealing Gasket, U.S. Appl. No. 14/088,865, filed Nov. 25, 2013; 29 pgs.
Vandal, Peter Joseph; U.S. Patent Application entitled: Slip on Groove Coupling With Multiple Sealing Gasket having U.S. Appl. No. 14/677,490, filed Apr. 2, 2015, 29 pgs.
Vandal; International Preliminary Report on Patentability for serial No. PCT/US/09/48637, filed Jun. 25, 2009, dated Jan. 5, 2011; 9 pgs.
Vandal; International Search Report and Written Opinion for serial No. PCT/US/09/48637, filed Jun. 25, 2009, dated Jan. 4, 2010; 15 pgs.
Vandal; PCT Application Entitled: Slip on Groove Coupling with Multiple Sealing Gasket; Serial No. PCT/US09/48637, filed Jun. 25, 2009; 33 pages.
http://web.archive.org/web/20061024140046/http://www.romacindustries.com/Installation-instructions/XR501-install.pdf; published on Oct. 24, 2006, 2 pgs.
http://web.archive.org/web/20061224052824/http://www.romacindustries.com/XR501.html; published on Dec. 24, 2006, 2 pgs.
Vandal, Peter Joseph; Canadian Office Action for serial No. 2,732,427, filed Jun. 25, 2009, dated Jul. 18, 2013, 3 pgs.
Gibb, John; Request for Inter Partes Reexamination under U.S. Appl. No. 95/001,878, filed Jan. 27, 2012; 36 pages.
Gibb, John; Request for Inter Partes Reexamination under U.S. Appl. No. 95/001,880, filed Feb. 1, 2012; 271 pages.
Vandal; U.S. Provisional Patent Application Entitled: Slip on Groove Coupling with Multiple Sealing Gasket, U.S. Appl. No. 61/133,300, filed Jun. 30, 2008; 9 pages.
Vandal, Peter; Office Action from Canadian Intellectual Property Office for Application No. 2,732,427, filed Jun. 25, 2009, dated Jul. 5, 2012; 4 pgs.
Beagen Jr., Joseph W.; Restriction Requirement for U.S. Appl. No. 13/354,459, filed Jan. 20, 2012, dated Oct. 31, 2014, 7 pgs.
Beagen Jr., Joseph William; Final Office Action for U.S. Appl. No. 13/354,459, filed Jan. 20, 2012, dated Jun. 3, 2015, 16pgs.
Beagen Jr., Joseph William; Non-Final Office Action for U.S. Appl. No. 13/354,459, filed Jan. 20, 2012, dated Jan. 27, 2015, 71 pgs.
Beagen Jr., Joseph William; Issue Notification for U.S. Appl. No. 13/354,464, filed Jan. 20, 2012, dated May 6, 2015, 1 pg.

(56) References Cited

OTHER PUBLICATIONS

Beagen Jr., Joseph William; Non-Final Office Action for U.S. Appl. No. 13/354,464, filed Jan. 20, 2012, dated Jan. 28, 2014; 79 pgs.
Beagen Jr., Joseph William; Notice of Allowance for U.S. Appl. No. 13/354,464, filed Jan. 20, 2012, dated Feb. 2, 2015, 9 pgs.
Beagen Jr.; U.S. Patent Application Entitled: Coupling with Tongue and Groove; U.S. Appl. No. 13/354,464, filed Jan. 20, 2012; 32 pages.
Beagen, Jr., Joseph William; Restriction Requirement for U.S. Appl. No. 13/354,464, filed Jan. 20, 2012, dated Oct. 4, 2013, 6 pgs.
Beagen Jr.; U.S. Patent Application Entitled: Slip-on Coupling; U.S. Appl. No. 13/354,459, filed Jan. 20, 2012; 33 pages.
Gibb, John; Request for Ex Parte Reexamination under U.S. Appl. No. 90/012,656, filed Sep. 14, 2012; 143 pages.
Gibb, John; Request for Inter Partes Reexamination under No. 95/002,401, filed Sep. 15, 2012; 147 pages.
Gibb, John; Request for Inter Partes Reexamination under U.S. Appl. No. 95/002,410, filed Sep. 15, 2012; 85 pages.
Beagen Jr., Joseph William; Notice of Allowance for U.S. Appl. No. 13/354,459, filed Jan. 20, 2012, dated Sep. 17, 2015, 7 pgs.
Beagen, Joseph William; U.S. Divisional Patent Application entitled: Slip-On Coupling having U.S. Appl. No. 14/741,665, filed Jun. 17, 2015, 33 pgs.
Beagen, Joseph William; Non-Final Office Action for U.S. Appl. No. 14/741,665, filed Jun. 17, 2015, dated Sep. 22, 2015, 59 pgs.
Beagen, Jr.; Joseph William; Final Office Action for U.S. Appl. No. 13/354,464, filed Jan. 20, 2012, dated Jul. 24, 2014, 20 pgs.
Beagen Jr., Joseph William; Final Office Action for U.S. Appl. No. 13/354,464, filed Jan. 20, 2012, dated Oct. 15, 2014, 13 pgs.
Beagen Jr., Joseph W.; U.S. Patent Application entitled: Coupling With Tongue and Groove, U.S. Appl. No. 14/506,307, filed Oct. 3, 2014, 33 pgs.
Beagen Jr.; U.S. Patent Application Entitled: Coupling Gasket with Multiple Sealing Surfaces; U.S. Appl. No. 13/354,466, filed Jan. 20, 2012; 32 pages.
Beagen, Jr., Joseph William; Non-Final Office Action for U.S. Appl. No. 13/354,466, filed Jan. 20, 2012, dated Jun. 13, 2014, 84 pgs.
Beagen, Jr.; Joseph William; Final Office Action for U.S. Appl. No. 13/354,466, filed Jan. 20, 2012, dated Sep. 9, 2014, 18 pgs.
Beagen Jr., Joseph William; Non-Final Office Action for U.S. Appl. No. 13/354,466, filed Jan. 20, 2012, dated Dec. 17, 2014, 12 pgs.
Beagen Jr., Joseph William; Final Office Action for U.S. Appl. No. 13/354,466, filed Jan. 20, 2012, dated Apr. 7, 2015, 21 pgs.
Beagen Jr., Joseph William; Non-Final Office Action for U.S. Appl. No. 13/354,466, filed Jan. 20, 2012, dated Jul. 30, 2015, 18 pgs.
Beagen Jr.; U.S. Patent Application Entitled: Slip-on Coupling Gasket; U.S. Appl. No. 13/354,470, filed Jan. 20, 2012; 32 pages.
Beagen, Jr.; Joseph William; Non-Final Office Action for U.S. Appl. No. 13/354,470, filed Jan. 20, 2012, dated Jun. 18, 2014, 97 pgs.
Beagen Jr., Joseph William; Final Office Action for U.S. Appl. No. 13/354,470, filed Jan. 20, 2012, dated Dec. 17, 2014, 20 pgs.
Beagen Jr., Joseph William; Non-Final Office Action for U.S. Appl. No. 13/354,470, filed Jan. 20, 2012, dated Apr. 8, 2015, 16 pgs.
Beagen Jr., Joseph William; Final Office Action for U.S. Appl. No. 13/354,470, filed Jan. 20, 2012, dated Aug. 11, 2015, 28 pgs.
Beagen Jr.; U.S. Patent Application Entitled: Slip-on Pipe Coupling Assembly; U.S. Appl. No. 29/406,887, filed Nov. 21, 2011; 6 pages.
Beagan Jr.; Notice of Allowance for U.S. Appl. No. 29/406,887, filed Nov. 21, 2011, dated Dec. 6, 2012; 47 pgs.
Beagen Jr, Joseph William; Supplemental Notice of Allowance for U.S. Appl. No. 29/406,887, filed Nov. 21, 2011, dated Jan. 10, 2013; 13 pgs.
Beagen, Jr., Joseph William; Supplemental Notice of Allowance for U.S. Appl. No. 29/406,887, filed Nov. 21, 2011, dated Mar. 14, 2013, 6 pgs.
Beagen, Jr., Joseph William; Issue Notification for U.S. Appl. No. 29/406,887, filed Nov. 21, 2011, dated Apr. 3, 2013, 1 pg.
Beagen Jr.; U.S. Patent Application Entitled: Slip-on Gasket; U.S. Appl. No. 29/405,039, filed Oct. 27, 2011; 3 pages.
Beagan, Jr., Joseph William; Notice of Allowance for U.S. Appl. No. 29/405,039, filed Oct. 27, 2011, dated Oct. 2, 2013, 68 pgs.
Beagan, Joseph William; Issue Notification for U.S. Appl. No. 29/405,039, filed Oct. 27, 2011, dated Dec. 11, 2013, 1 pg.
Beagen Jr., Joseph William; Supplemental Notice of Allowance for U.S. Appl. No. 29/405,039, filed Oct. 27, 2011, dated Nov. 25, 2013, 9 pgs.
Beagen Jr.; U.S. Patent Application Entitled: Slip-On Coupling Segment, U.S. Appl. No. 29/406,886, filed Nov. 21, 2011; 5 pgs.
Beagan Jr.; Notice of Allowance for U.S. Appl. No. 29/406,886, filed Nov. 21, 2011, dated Dec. 6, 2012; 47 pgs.
Beagen Jr, Joseph William; Supplemental Notice of Allowance for U.S. Appl. No. 29/406,886, filed Nov. 21, 2011, dated Feb. 28, 2013; 6 pgs.
Beagen, Jr., Joseph William; Issue Notification for U.S. Appl. No. 29/406,886, filed Nov. 21, 2011, dated Apr. 3, 2013, 1 pg.
Beagen Jr., Joseph William; Supplemental Notice of Allowance for U.S. Appl. No. 29/406,886, filed Nov. 21, 2011, dated Jan. 11, 2013, 13 pgs.
Schell, Ty; U.S. Patent Application entitled: Coupling with Extending Parting Line, having U.S. Appl. No. 13/667,786, filed Nov. 2, 2012, 29 pgs.
Schell, Ty; Restriction Requirement for U.S. Appl. No. 13/667,786, filed Nov. 2, 2012, dated Jan. 10, 2014, 6 pgs.
Schell, Ty; Non-Final Office Action for U.S. Appl. No. 13/667,786, filed Nov. 2, 2012, dated Feb. 24, 2014; 74 pgs.
Schell, Ty; Final Office Action for U.S. Appl. No. 13/667,786, filed Nov. 2, 2012, dated Jul. 3, 2014, 9 pgs.
Schell, Ty; Applicant Initiated Interview Summary for U.S Appl. No. 13/667,786, filed Nov. 2, 2012, dated Jul. 23, 2014, 3 pgs.
Schell, Ty; Non-Final Office Action for U.S. Appl. No. 13/667,786, filed Nov. 2, 2012, dated Oct. 16, 2014, 26 pgs.
Schell, Ty; Final Office Action for U.S. Appl. No. 13/667,786, filed Nov. 2, 2012, dated Mar. 9, 2015, 14 pgs.
Schell, Ty; Advisory Action for U.S. Appl. No. 13/667,786, filed Nov. 2, 2012, dated May 14, 2015, 2 pgs.
Schell, Ty; Applicant-Initiated Interview Summary for U.S. Appl. No. 13/667,786, filed Nov. 2, 2012, dated May 22, 2015, 3 pgs.
Schell, Ty; Notice of Allowance for U.S. Appl. No. 13/667,786, filed Nov. 2, 2012, dated Jun. 29, 2015, 21 pgs.
Schell, Ty; Issue Notification for U.S. Appl. No. 13/667,786, filed Nov. 2, 2012, dated Oct. 7, 2015, 1 pg.
Schell, Ty; U.S. Divisional Application entitled: Coupling With Extending Parting Line having U.S. Appl. No. 14/848,641, filed Sep. 9, 2015, 30 pgs.
Beagen, Joseph William, Jr.; Supplemental Notice of Allowability for U.S. Appl. No. 14/506,307, filed Oct. 3, 2014, dated Feb. 28, 2017, 6 pgs.
Beagen, Joseph William, Jr.; Notice of Allowance for U.S. Appl. No. 14/506,307, filed Oct. 3, 2014, dated Jan. 3, 2017, 9 pgs.
Beagen, Joseph William, Jr.; Issue Notification for U.S. Appl. No. 14/506,307, filed Oct. 3, 2014, dated Apr. 5, 2017, 1 page.
Vandal, Peter Joseph; Decision of Appeal for U.S. Appl. No. 14/088,865, filed Nov. 25, 2013, dated Aug. 18, 2017, 11 pgs.
Vandal, Peter Joseph; Non Final Office Action for U.S. Appl. No. 14/088,865, filed Nov. 25, 2013, dated Nov. 14, 2017, 51 pgs.
Schell, Ty; Non-Final Office Action for U.S. Appl. No. 14/848,641, filed Sep. 9, 2015, dated Jan. 11, 2018, 83 pgs.
Beagen, Jr., Joseph William; Requirement for Restriction/Election for U.S. Appl. No. 15/455,225, filed Mar. 10, 2017, dated May 16, 2018, 6 pgs.
Vandal, Peter Joseph; Notice of Allowance for U.S. Appl. No. 14/088,865, filed Nov. 25, 2013, dated Apr. 5, 2018, 10 pgs.
Beagen Jr, Joseph William; Office Action for Canadian application No. 2,776,206, filed May 7, 2012, dated May 14, 2018, 1 pgs.

SLIP ON GROOVE COUPLING WITH MULTIPLE SEALING GASKET

REFERENCE TO RELATED APPLICATIONS

This application is a continuation of U.S. application Ser. No. 14/019,182, filed Sep. 5, 2013, which issued into U.S. Pat. No. 9,239,123, on Jan. 19, 2016, which is a continuation of U.S. application Ser. No. 13/554,721, filed Jul. 20, 2012, which issued into U.S. Pat. No. 8,550,502, on Oct. 8, 2013, which is a continuation of U.S. application Ser. No. 12/490,113, filed Jun. 23, 2009, which issued into U.S. Pat. No. 8,282,136, on Oct. 9, 2012, which claimed the benefit of U.S. Provisional Application No. 61/133,300, filed Jun. 30, 2008, all of which are hereby specifically incorporated by reference herein in their entireties.

BACKGROUND

1. Field of the Invention

The invention is directed to coupling devices used to join sections of pipe and methods of their use and, in particularly, methods and systems of coupling devices that are installable in one unit without disassembly.

2. Background of the Invention

A common type of pipe coupling device used to join two pipes employs a housing consisting of two half-circular elements joined together with bolts at either end. Usually the housing is used to secure two lengths of pipe together. In order to prevent leaking between the two pipes, a gasket is usually secured around the seam created at the junction of the two pipes. The two halves of the housing surround the gasket and press the gasket around the seam. FIG. 1 shows a basic coupling device 100. Coupling device 100 includes an upper housing 105 and a lower housing 106. Upper housing 105 and lower housing 106 are held together by bolts 115.

In order to install the device, workers must disassemble the entire apparatus and remove the gasket from the housing. Approximately half of the gasket is then forced over one end of one pipe. An end of the other pipe is forced into the remaining portion of the gasket, thereby joining the two pipes together. To secure the pipes, the two halves of the housing are placed around the gasket and then bolts or other fastening devices are used to complete the installation. In most cases, the inner diameter of the gasket is slightly smaller than the outer diameter of the pipes. Therefore, the worker must stretch the gasket around the pipe ends.

Another device for joining two pipes is described in U.S. Pat. No. 7,401,819, herein incorporated in its entirety. The device described in U.S. Pat. No. 7,401,819 is a traditional coupling and a gasket that fits within the coupling. The gasket has a tongue that protrudes from the inner surface of the gasket. To join the pipes, one pipe is inserted into the gasket up to the tongue and then the other pipe is inserted into the other end of the gasket up to the tongue.

Each of these devices and methods takes time and can cause errors in the alignment and joining of the pipes. Therefore it is desirable to have a coupling that can be easily installed without disassembling prior to use.

SUMMARY

The present invention overcomes the problems and disadvantages associated with current strategies and designs and provides new tools and methods of coupling pipes.

One embodiment of the invention is directed to a coupling for joining two pipes. The coupling includes, an upper housing, a lower housing, at least one fastening device for seeming the upper housing to the lower housing, and a gasket positioned within the upper and lower housings. The gasket is includes two primary seals, one on each outer edge of the gasket, and at least two secondary seals on a rib protruding from the inner surface of the gasket and between the two primary seals. The primary seals are adapted so that the gasket slides completely over the end of one pipe without disassembling the coupling.

In another embodiment, the fastening devices are selected from the group including bolts, clips, snap-couplings, rivets, and ties. In certain embodiments, the inner diameter of the gasket is larger than the outer diameter of the pipes. In certain embodiments, the outer diameter of the gasket is concave. In certain embodiments, each primary seal includes a gripping extension. The gripping extension is adapted to grab the end of a pipe as the gasket slides over the end of the pipe.

In certain embodiments, each primary seal has stepped ribs on the inner surface of the gasket. In certain embodiments, a portion of each of the upper housing and the lower housing is chamfered. The chamfered sections are on the inner surface of each of the upper housing and the lower housing adjacent to where the upper housing and the lower housing meet.

In certain embodiments, the coupling includes spacers to separate the upper housing from the lower housing. In certain embodiments, the spacers are removable. In certain embodiments, the spacers are permanent and compressible. In certain embodiments, the spacers are springs.

In certain embodiments, the primary seals have rounded interior ends. In certain embodiments, the primary seals have interior ends that angle toward the outer surface of the gasket. In certain embodiments, the corners of the outer surface of the gasket are concave. In certain embodiments, there are three secondary seals.

In certain embodiments, the coupling includes at least one slot in the outer surface of the gasket. In certain embodiments, there is one continuous slot around the circumference of the gasket. In certain embodiments, there are a plurality of slots around the circumference of the gasket. In certain embodiments, the coupling includes at least one retaining device. In certain embodiments, the retaining device is a single wire surrounding the upper housing and the lower housing. In certain embodiments, the gasket is lubricated. In certain embodiments, the lower housing and the fastening device is one element attached to the upper housing.

Another embodiment of the invention is directed toward a gasket. The gasket includes two primary seals, one on each outer edge of the gasket, and at least two secondary seals on a rib protruding from an inner surface of the gasket and between the two primary seals. The primary seals are adapted so that the gasket slides completely over the end of a pipe without disassembling the coupling.

In certain embodiments, the inner diameter of the gasket is larger than the outer diameter of the pipe. In certain embodiments, the outer diameter of the gasket is concave. In certain embodiments, each primary seal includes a gripping extension. The gripping extension is adapted to grab the end of a pipe as the gasket slides over the end of the pipe. In certain embodiments, each primary seal has stepped ribs on the inner surface of the gasket. In certain embodiments, the primary seals have rounded interior ends. In curtain embodiments, the primary seals have interior ends that angle toward the outer surface of the gasket. In certain embodiments, the corners of the outer surface of the gasket are concave.

In certain embodiments, there are three secondary seals. In certain embodiments, the gasket includes at least one slot in the outer surface of the gasket. In certain embodiments, there is one continuous slot around the circumference of the gasket. In certain embodiments, there are a plurality of slots around the circumference of the gasket.

Another embodiment of the invention is a method of coupling two pipes. The method includes, placing an assembled coupling over one end of one pipe, aligning a second pipe with the first pipe, sliding the coupling off the end of the first pipe so that at least a portion of the coupling is around each pipe, and securing the coupling.

In certain embodiments, the coupling includes an upper housing, a lower housing, at least one fastening device coupling the upper housing to the lower housing, and a gasket positioned within the upper and lower housings. The gasket is comprised of two primary seals, one on each outer edge of the gasket, and at least two secondary seals on a rib protruding from an inner surface of the gasket and between the two primary seals. The primary seals are adapted so that the gasket slides completely over the end of the one.

In certain embodiments, the step of placing an assembled coupling over one end of a first pipe is completed without disassembling the coupling. In certain embodiments, the step of securing the coupling is completed by tightening the fastening devices. Certain embodiments further include the step of aligning the coupling with a groove in each pipe. In another embodiment, the fastening devices are selected from the group including of bolts, clips, snap-couplings, rivets, and ties. In certain embodiments, the inner diameter of the gasket is larger than the outer diameter of the pipes. In certain embodiments, the outer diameter of the gasket is concave. In certain embodiments, each primary seal includes a gripping extension. The gripping extension is adapted to grab the end of a pipe as the gasket slides over the end of the pipe.

In certain embodiments, each primary seal has stepped ribs on the inner surface of the gasket. In certain embodiments, a portion of each of the upper housing and the lower housing is chamfered. The chamfered sections are on the inner surface of each of the upper housing and the lower housing adjacent to where the upper housing and the lower housing meet.

In certain embodiments, the coupling includes spacers to separate the upper housing from the lower housing. In certain embodiments, the spacers are removable. In certain embodiments, the spacers are permanent and compressible. In certain embodiments, the spacers are springs.

In certain embodiments, the primary seals have rounded interior ends. In certain embodiments, the primary seals have interior ends that angle toward the outer surface of the gasket. In certain embodiments, the corners of the outer surface of the gasket are concave. In certain embodiments, there are three secondary seals.

In certain embodiments, the coupling includes at least one slot in the outer surface of the gasket. In certain embodiments, there is one continuous slot around the circumference of the gasket. In certain embodiments, there are a plurality of slots around the circumference of the gasket. In certain embodiments, the coupling includes at least one retaining device. In certain embodiments, the retaining device is a single wire surrounding the upper housing and the lower housing. In certain embodiments, the gasket is lubricated. In certain embodiments, the lower housing and the fastening device is one element attached to the upper housing.

Other embodiments and advantages of the invention are set forth in part in the description, which follows, and in part, may be obvious from this description, or may be learned from the practice of the invention.

DESCRIPTION OF THE DRAWINGS

The invention is described in greater detail by way of example only and with reference to the attached drawings, in which.

DETAILED DESCRIPTION

As embodied and broadly described herein, the disclosures herein provide detailed embodiments of the invention. However, the disclosed embodiments are merely exemplary of the invention that may be embodied in various and alternative forms. Therefore, there is no intent that specific structural and functional details should be limiting, but rather the intention is that they provide a basis for the claims and as a representative basis for teaching one skilled in the art to variously employ the present invention.

A problem in the art capable of being solved by the embodiments of the present invention is quickly and easily joining two pipes together without first disassembling the coupling. It has been surprisingly discovered that certain configurations of the gasket allow joining two pipes together without having to disassemble the coupling. The gasket may have certain elements that will be further described below that allow it to slide completely over one pipe before the two pipes are joined.

Figure 1:
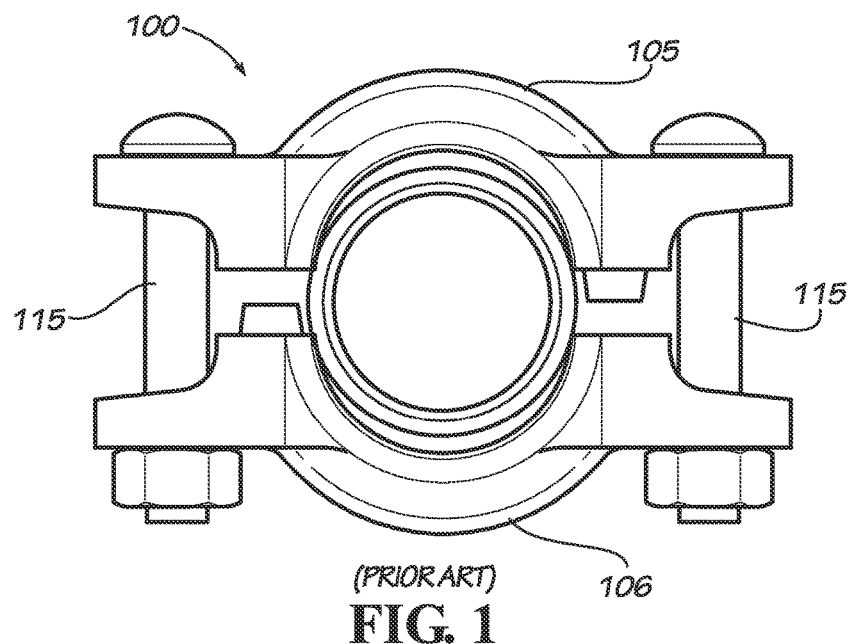
FIG. 1 is a basic coupling device.
Figure 2A:
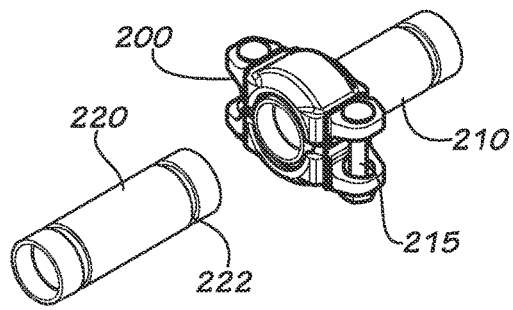
FIGS. 2a-c show the steps of installing a coupling of the instant invention.
Figure 2B:
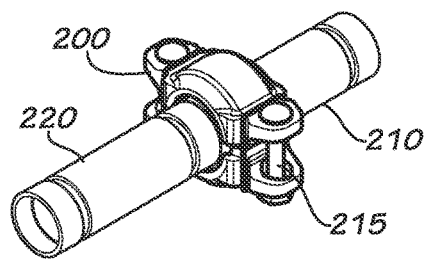
Figure 2C:
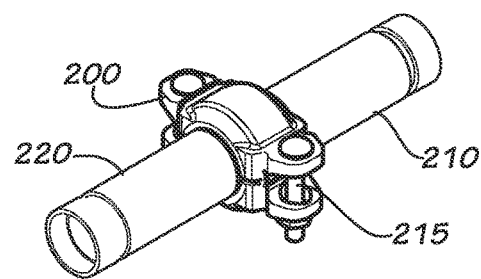
Figure 3A:
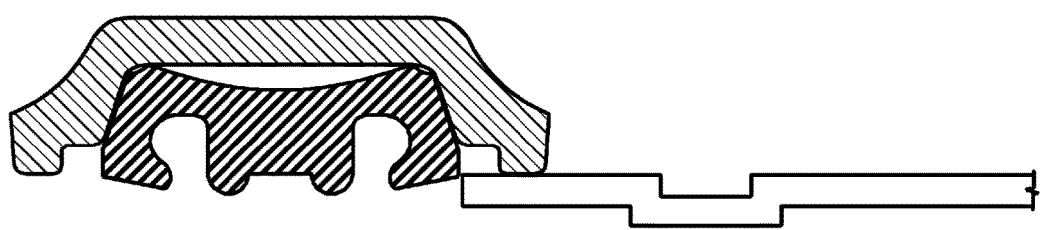
FIGS. 3a-c show a cut away view of FIGS. 2a-c.
Figure 3B:
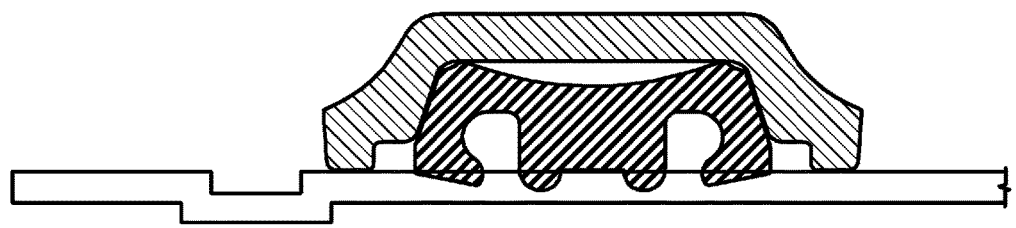
Figure 3C:
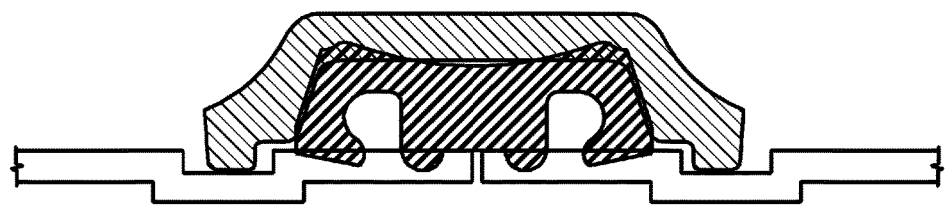

FIGS. 2a-2c show the steps of a method of installing an embodiment of the invention. In FIG. 2a, coupling 200 is placed completely over one end of pipe 210. Coupling 200 remains held together by bolts 215 and surrounds a gasket that is in contact with pipe 210. In FIG. 2b, pipe 220 is brought into alignment with pipe 210 and an end of one pipe is placed adjacent to an end of the other pipe. Preferably pipe 210 and pipe 220 are in direct contact with each other, however in certain circumstances a slight gap is permissible. In the preferred embodiment, no part of the gasket protrudes between pipe 210 and 220, however, in certain embodiments, a portion of the gasket protrudes between pipe 210 and 220. In FIG. 2c, coupling 280 is slid over the end of pipe 220 so that a portion of coupling 200 surrounds pipe 210 and a portion of coupling 200 surround pipe 220. Preferably, coupling 205 is equally distributed over pipe 210 and 220. Bolts 215 are then tightened to fully secure coupling 200 over the two pipes and thus join the two pipes in fluid communication. The ends of each pine may have a groove 222 into which an inner diameter of coupling 200 fits upon completion of the assembly of coupling 200 and pipes 210 and 220, FIGS. 3a-3c show the above described steps in a cut away, side view.

Bolts 215 may be of any material including but not limited to plastic, metal, fiber, and synthetic materials. Bolts 215 can be of any dimension. In certain embodiments, the heads of bolts 215 will break off at a predetermined torque to prevent over tightening of bolts 215. In other embodiments bolts 215 may be replaced with other fastening devices. Any fastening device may be used, including clips, snap-couplings, rivets, and ties.

Pipes 210 and 220 can be used for transporting any material, including, but not limited to, water, oil, and gas. Pipes 210 and 220 may be of any size and coupling 200 is of any complementary size to fit over and join pipes 210 and 220. Preferably, pipes 210 and 220 are of the same size; however, in certain embodiments of coupling 200, pipes of different sizes are joined.

Figure 4:
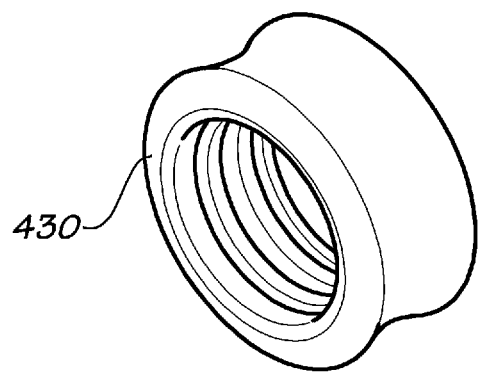
FIG. 4 is a isometric view of an embodiment of a gasket of the instant invention.

FIG. 4 is an isometric view of an embodiment of a gasket 430 of the invention. Gasket 430 can be made of any material that is capable of forming a seal and deforming. For instance, gasket 430 can be made from EPDM, nitrile, fluro-elastomer, plastic, rubber, fiber, synthetic materials, resin, etc. Furthermore, gasket 430 may be produced using injection molding, extrusion, compression molding, machining, casting, 3-D printing, or any other method known in the art. Gasket 430 is preferably a continuous solid mass.

Figure 5:
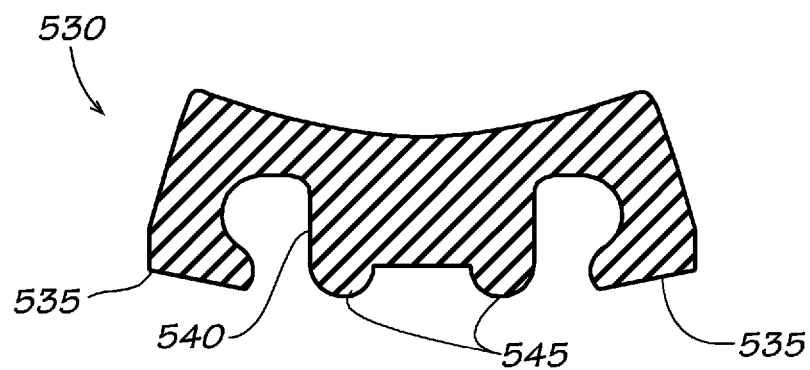
FIG. 5 is a cut away view of an embodiment of a gasket of the instant invention.

FIG. 5 is a cut away view of an embodiment of a gasket 530. Gasket 530 preferably has an inner diameter that is larger than the outer diameter of the pipes around which gasket 530 is to be installed. Furthermore, the inner diameter of gasket 530 is preferably larger than the inner diameter of a standard gasket. Such a configuration will assist in ease of installation of gasket 530. In certain embodiments, the outer diameter of gasket 530 is also larger than the outer diameter of a standard gasket. Having a larger outer diameter assists in compressing gasket 530 into the pipes around which gasket 530 is installed.

Gasket 530, in certain embodiments, has a primary seal 535 on either side of gasket 530, which, upon complete assembly of the coupling, is press into the outer walls of the pipes. In certain embodiments, gasket 530 has an internal rib 540 positioned between the two primary seals 535. Internal rib 540 includes at least two secondary seals 545 on either end thereof. Secondary seals 545 are positioned so that upon complete assembly of the coupling each secondary seal 545 is pressed into the outer walls of the pipes and is adjacent to the seam between the two pipes. The positioning of primary seals 535 and secondary seals 545 relative to the two pipes upon complete assembly of the coupling can be seen more clearly in FIG. 3c.

Figure 17:
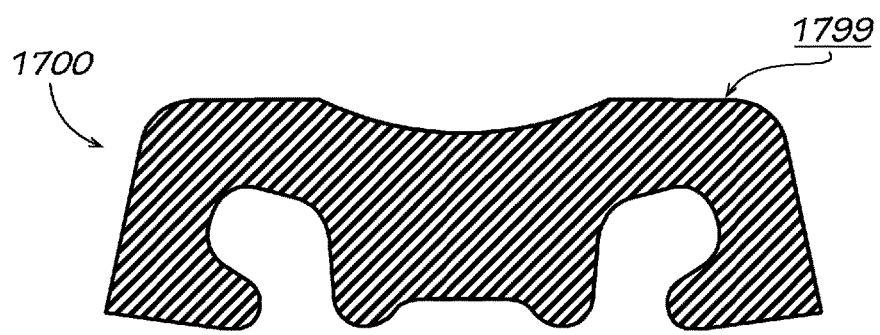
FIG. 17 is a side view of another embodiment of the gasket.

In certain embodiments, the outer diameter of gasket 530 is outwardly curved or concave. The curve assists in compressing gasket 530 into the pipes and completing the seal between gasket 530 and the pipes upon complete assembly of the coupling. FIG. 17 shows another embodiment of a gasket 1700 where at least a portion of the outer surface 1799 is flat.

Figure 6A:
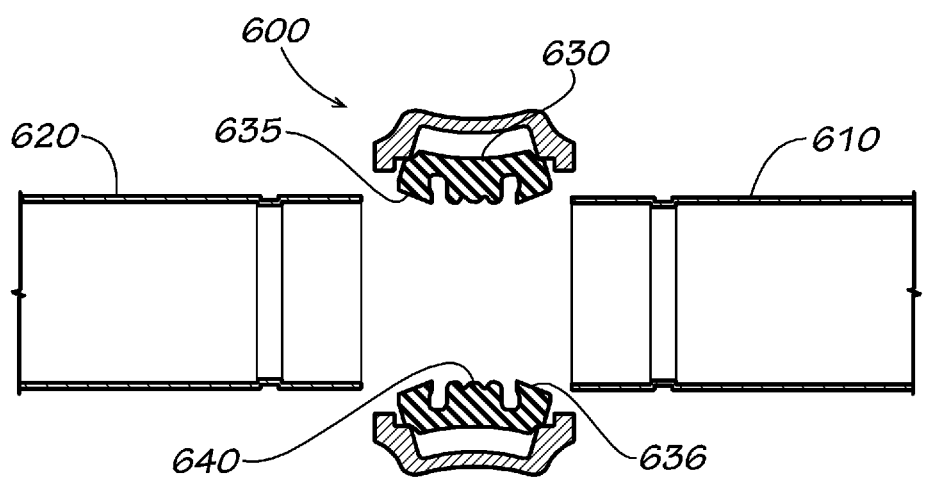
FIGS. 6a-d are cut away views of another embodiment of a gasket of the instant invention.
Figure 6B:
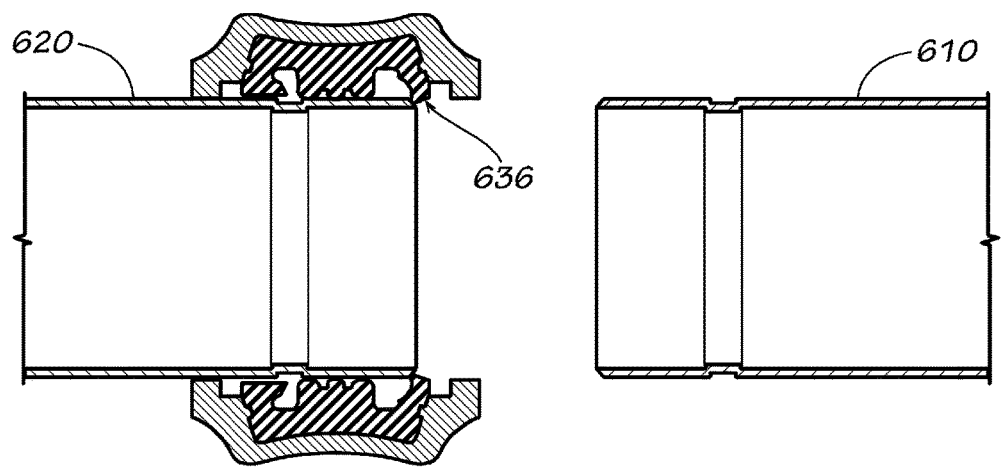
Figure 6C:
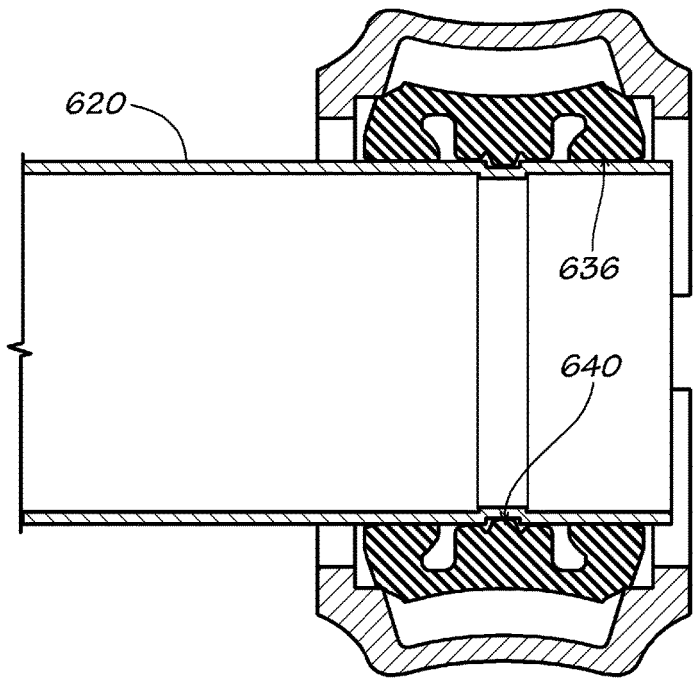
Figure 6D:
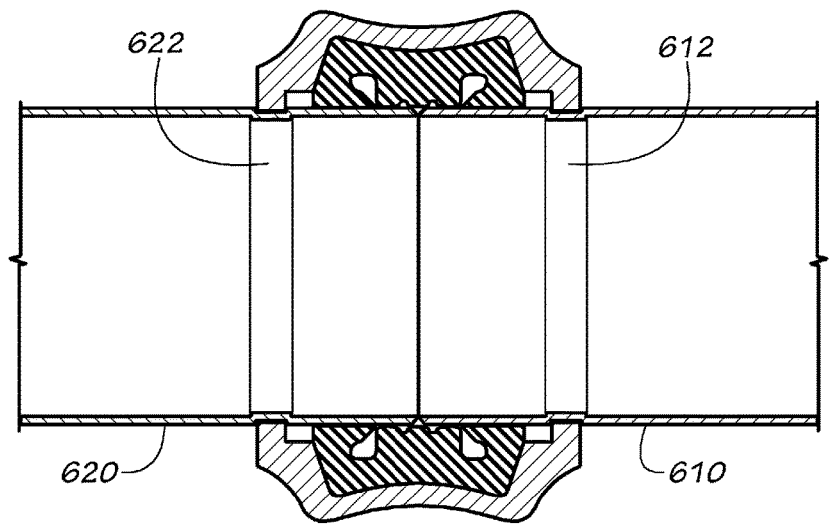

FIGS. 6a-d show an embodiment of coupling 600 where primary seals 635 contain extensions 636 to grip the edge of pipe 620. In certain embodiments, coupling 600 is held open by gasket 640 prior to insertion over pipe 620. See FIG. 6a. As coupling 600 and gasket 630 slide over pipe 620, extensions 636 of primary seal 635 grab the edge of pipe 620. See FIG. 6b. Upon further force, primary seal 635 will snap into position around pipe 620 as shown in FIG. 6c. Pipe 610 is then aligned with pipe 620 and coupling 600 and gasket 630 are slid back off pipe 620 and onto pipe 610 so that a portion of coupling 600 and gasket 630 are in contact with each pipe. Coupling 600 can then be tightened and engage a groove 612 and 622 at the end of each of pipe 610 and 620, respectively. See FIG. 6d.

Figure 7A:
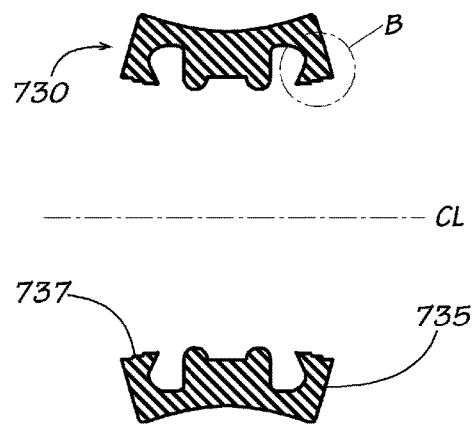
FIGS. 7a-b are cut away views of another embodiment of a gasket of the instant invention.
Figure 7B:
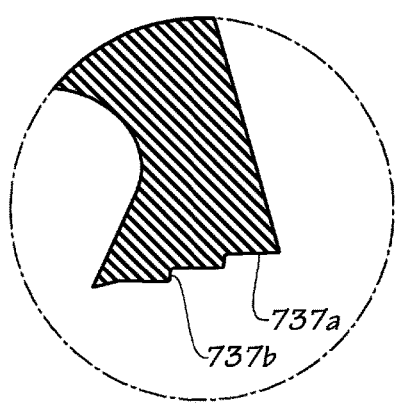

FIG. 7a shows an embodiment of a gasket 730. In gasket 730, primary seals 735 have stepped ribs 737 on the inner surface of gasket 730. FIG. 7b shows an enlarged view of the primary seal encircled in FIG. 7a. It should be noted that each primary seal is preferably a mirror image of the other primary seal, thus the discussion of the primary seal in FIG. 7b applies to the other primary seal. While FIG. 7b shows two stepped ribs 737, any number of stepped ribs may be included on primary seal 735. In certain embodiments, each rib includes a first portion 737a that is substantially parallel to the center line CL, shown in FIG. 7a, and a second portion 737b that is substantially perpendicular to first portion 737a. In other embodiments second portion 737b is not substantially perpendicular to first portion 737a but, instead, is oriented at an acute or obtuse angle to first portion 737a Preferably, first portion 737a is longer than second portion 737b, however any ratio can be used.

Figure 8:
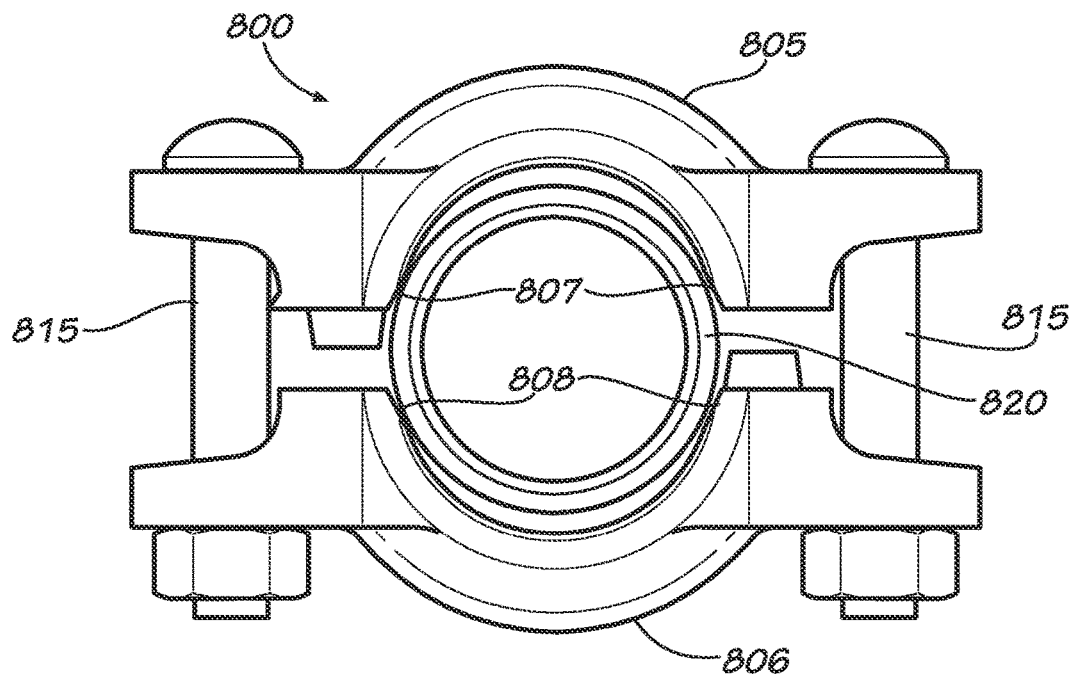
FIG. 8 is a side view of an embodiment of the coupling of the instant invention.

FIG. 8 shows an embodiment of coupling 800. Coupling 800 consists of two housings 805 and 806 held together by bolts 815. Both upper housing 805 and lower housing 806 have inner portions 807 and 808, respectively, which are chamfered. Chamfered sections 807 and 808 consist of portions of housings 805 and 806 that have been removed to widen the inner diameter of the point of contact between the two housings. Chamfered sections 807 and 808 may be created by grinding, machining or melting away a portion of housings 805 and 806 or may be included during the production of housings 805 and 806. By adding chamfered sections 807 and 808, pipe 820 can it through coupling 800 with housings 805 and 806 in a closer configuration than if chamfered sections 807 and 808 were not present. Thus, bolts 815 can be shorter.

Figure 9:
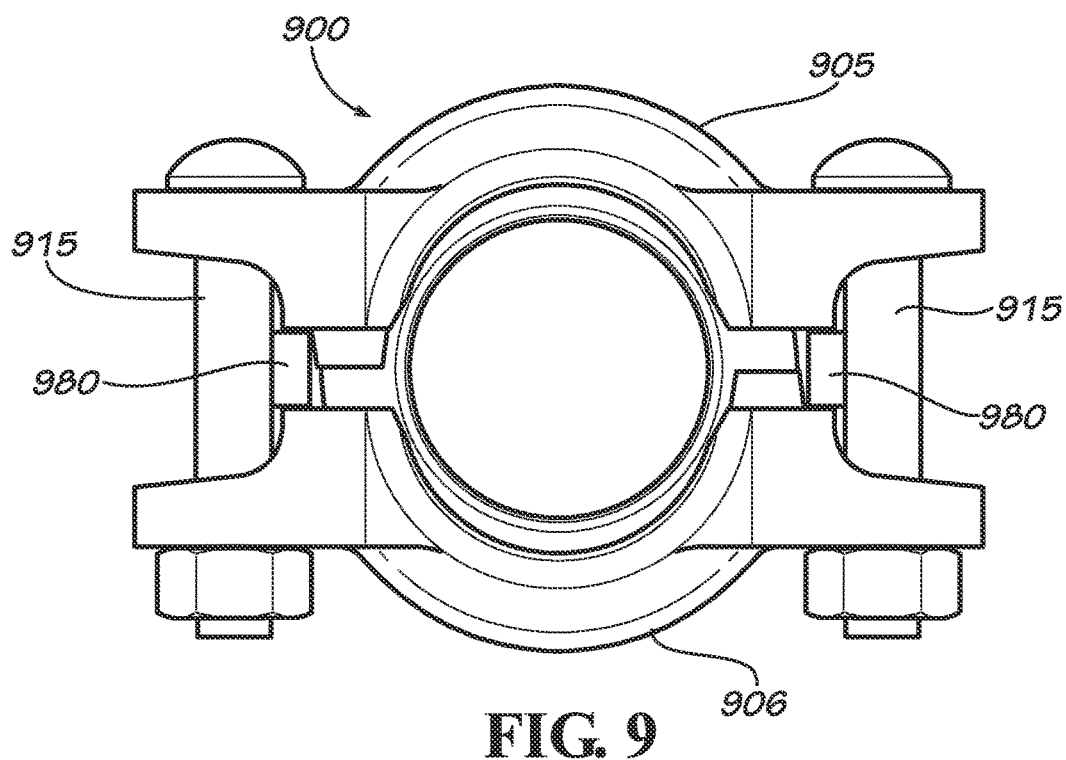
FIG. 9 is a side view of another embodiment of the coupling of the instant invention.

FIG. 9 shows another embodiment of a coupling 900. Coupling 900 includes spacers 980 between upper housing 905 and lower housing 906. Spacers 980 are placed adjacent to bolts 915 and keep upper housing 905 and lower housing 906 at a predetermined separation. The separation between upper housing 905 and lower housing 906 helps in inserting a pipe into coupling 900. Spacers 980 may be removable prior to tightening bolts 915. In the removable embodiment, spacer 980 may be either disposable or reusable. In other embodiments, spacers 980 are permanent and compress upon tightening of bolts 915. The compressible embodiment may include scored sections to facility collapse. Although shown as rectangular, spacers 980 may be of any shape or size so long as spacers 980 keep upper housing 905 and lower housing 915 at a predetermined separation. Spacers 980 may be made of any material, including, but not limited to, metal, plastic, fiber, foam, natural materials, rubber, and silicone.

Figure 10:
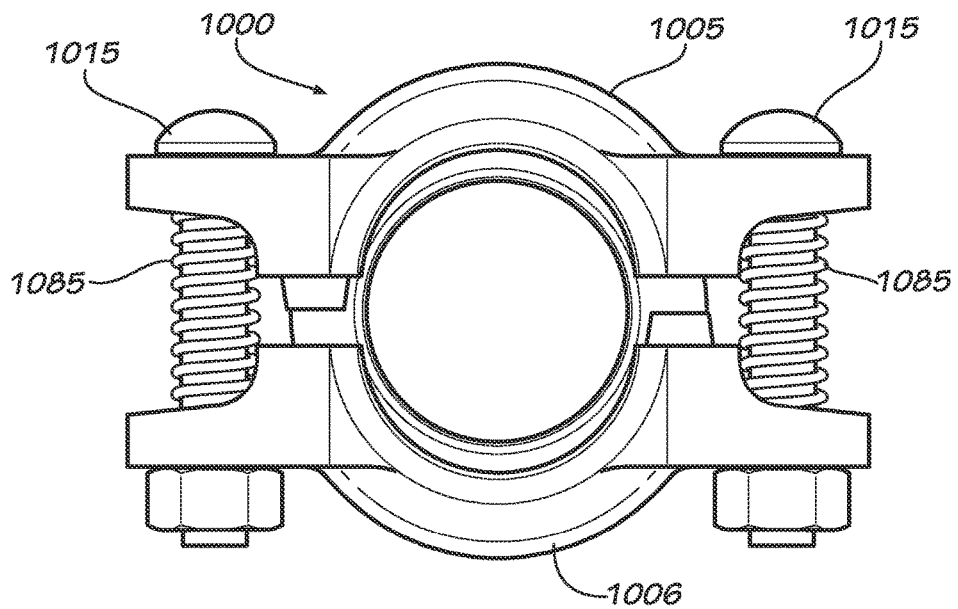
FIG. 10 is a side view of another embodiment of the coupling of the instant invention.

FIG. 10 shows an embodiment of the coupling 1000, similar to the coupling 900 shown in FIG. 9. In coupling 1000, springs 1085 replaces spacers 980 of coupling 900. Springs 1085 are threaded over bolts 1015 and be used to keep upper housing 1005 and lower housing 1006 separated. Springs 1085 compress when bolts 1015 are tightened, thereby eliminating the separation between upper housing 1005 and lower housing 1006. Springs 1085 may be of any material, including but not limited to metal, foam, and plastic.

Figure 11A:
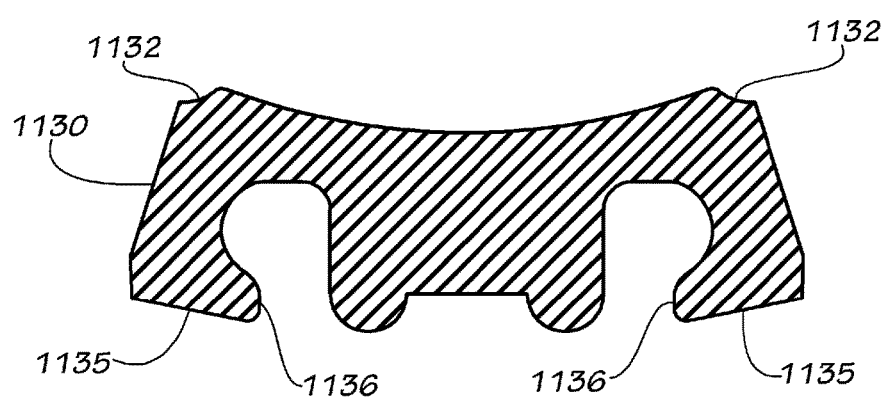
FIG. 11a-b are a cut away views of another embodiment of a gasket of the instant invention.
Figure 11B:
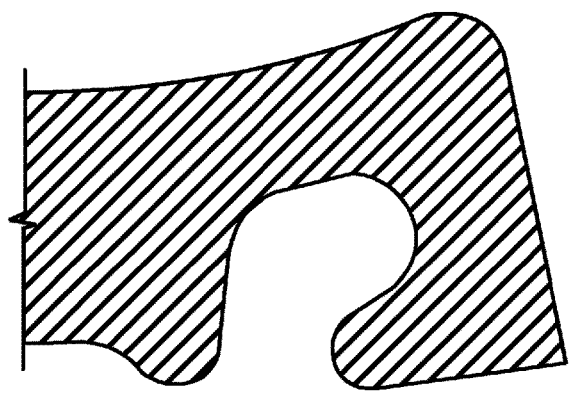
Figure 12:
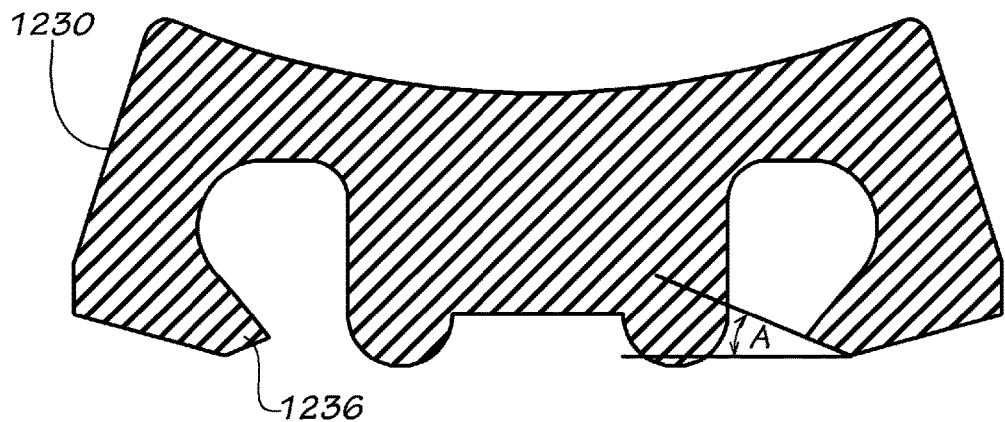
FIG. 12 is a out away view of another embodiment of a gasket of the instant invention.

FIG. 11a shows a cut away view of an embodiment of gasket 1130. In gasket 1130, primary seals 1135 of gasket 1130 have rounded ends 1136. Rounded ends 1136 are located on the inside edge of primary seals 1135. Rounded ends 1136 may be of any radius and may be of any shape, including ovoid and circular. Rounded ends 1136 help gasket 1130 slide over a pipe. Alternatively, as shown in FIG. 12, ends 1236 are angled toward the outer diameter of gasket 1230. Angle A may be of any angle greater than zero. Additionally, in certain embodiments, gasket 1130 of FIG. 11a, has the upper, outer corners 1132 removed or concave. Removed corners 1132 may be of any shape or size. Removed corners 1132 assist in keeping the upper and lower housings apart prior to tightening the bolts to further ease sliding the coupling over a pipe end. FIG. 11b shows another embodiment of a gasket with rounded ends.

Figure 13:
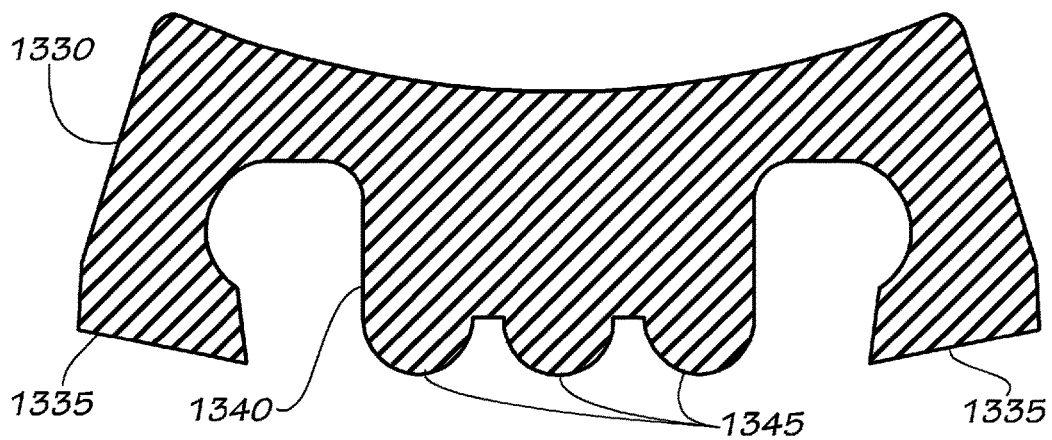
FIG. 13 is a cut away view of another embodiment of a gasket of the instant invention.

FIG. 13 shows a cut away view of an embodiment of gasket 1330. As in the embodiment of gasket 530 shown in FIG. 5, the embodiment of gasket 1330 shown in FIG. 13 includes primary seals 1335 and internal rib 1340. However, in gasket 1330, internal rib 1340 includes three secondary seals 1345. The middle secondary seal increases stiffness of internal rib 1340 and improves the seal between the pipes and gasket 1330. Additionally, the middle secondary seal may compensate for any errors in alignment of the pipes around which gasket 1330 is placed. The middle secondary seal may be equal, larger, or smaller in size to the outer secondary seals.

Figure 14:
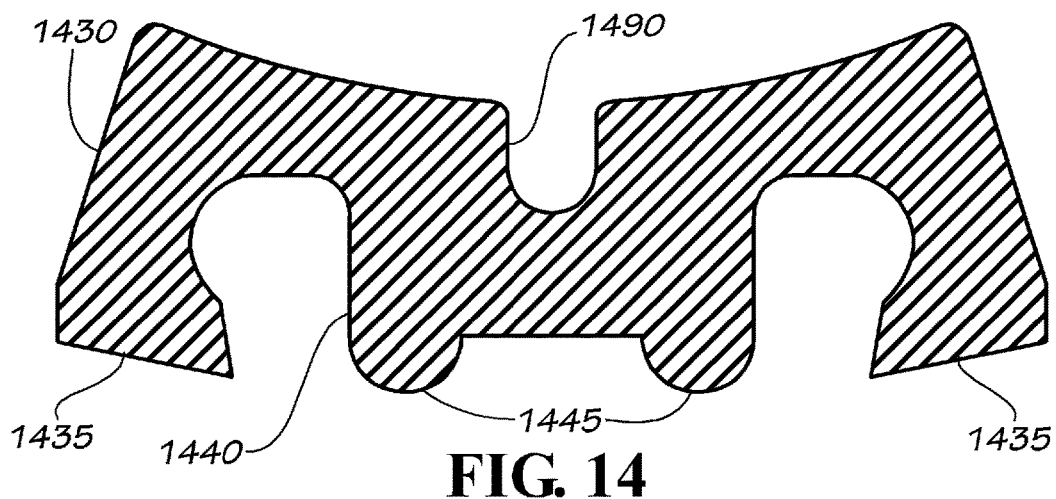
FIG. 14 is a cut away view of another embodiment of a gasket of the instant invention.
Figure 15A:
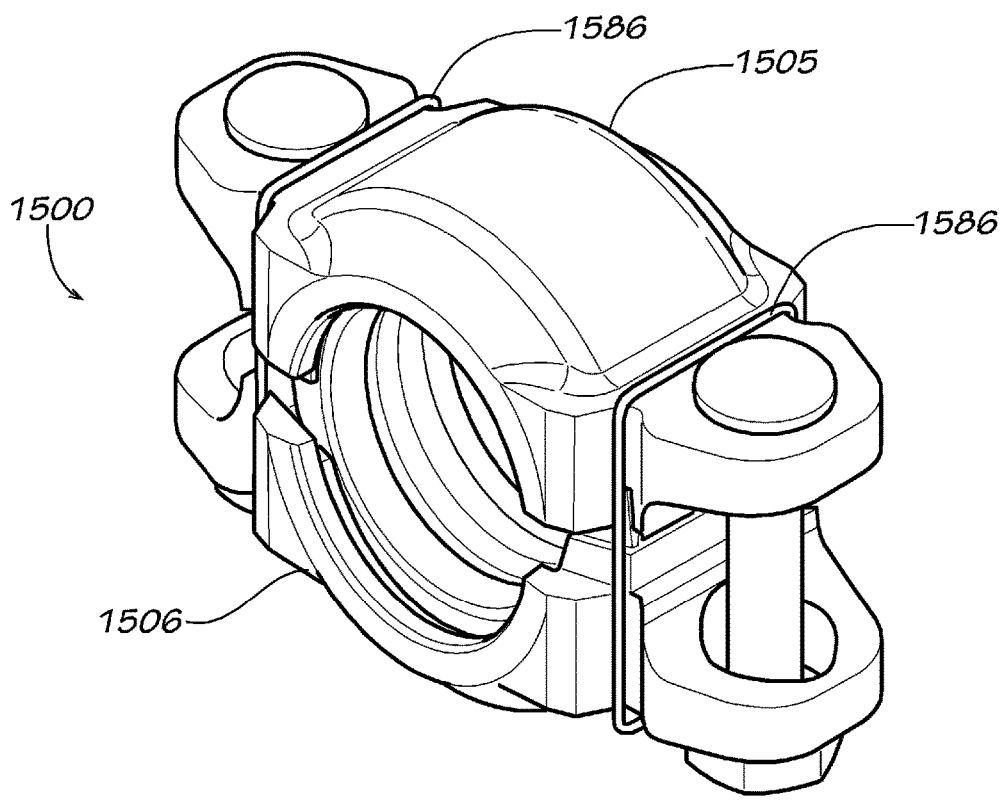
FIGS. 15a-c are views of another embodiment of the coupling of the gasket of the instant invention.
Figure 15B:
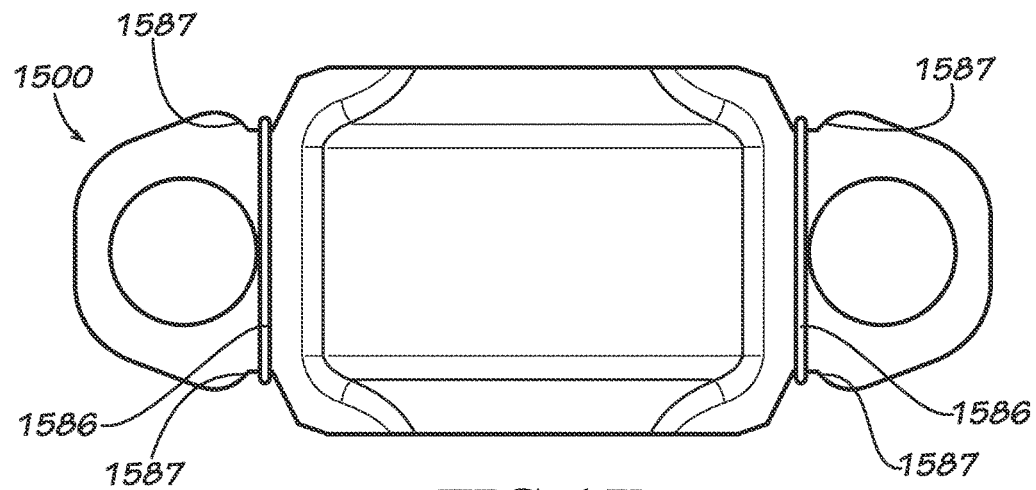
Figure 15C:
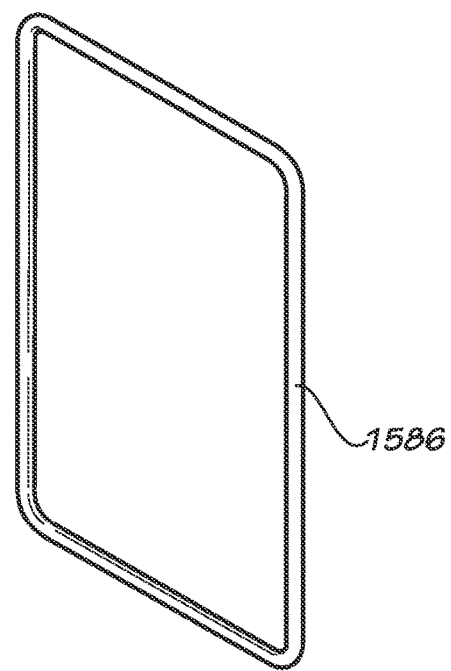

FIG. 14 shows a cut away view of an embodiment of gasket 1430. Gasket 1430 also includes primary seals 1435, internal rib 1440, and secondary seals 1445. In certain embodiments of gasket 1430 there is at least one slot 1490 in the outer diameter of gasket 1430. Preferably, slot 1490 is located along the centerline of gasket 1430; however slot 1490 can be at any location. In certain embodiments of gasket 1430, slot 1490 is continuous around the entire diameter of gasket 1430. In other embodiments of gasket 1430, slot 1490 is intermittent around the diameter of gasket 1430. Slot 1490 may be of any shape, including but not limited to circular, ovoid, triangular, square, and rectangular. In the preferred embodiment, gasket 1430 will have one slot 1490; however any number of slots may be used. Slot 1490 lessens the amount of material used in gasket 1430 and provides extra free volume to prevent over-compression of gasket 1430.

FIGS. 15a-15e show an embodiment of coupling 1500 that includes at least one retainer 1586. Retainers 1586 may be made of any material, including metal, plastic, rubber, synthetic materials, and fibers. In certain embodiments of coupling 1500, the upper housing 1505 and lower housing 1506 are adapted to hold retainers 1586 via notches 1587. Retainers 1586 prevent upper housing 1505 and lower housing 1506 from separating during installation of coupling 1500. Furthermore, retainers 1586 add stability and rigidity to coupling 1500 during installation and shipping. Retainers 1586 may be permanent or removable. In the removable embodiment, retainers 1586 may be disposable. While rectangular retainers 1586 are shown, any shape may be utilized. Furthermore, retainers 1586 may have any dimensions.

Figure 16:
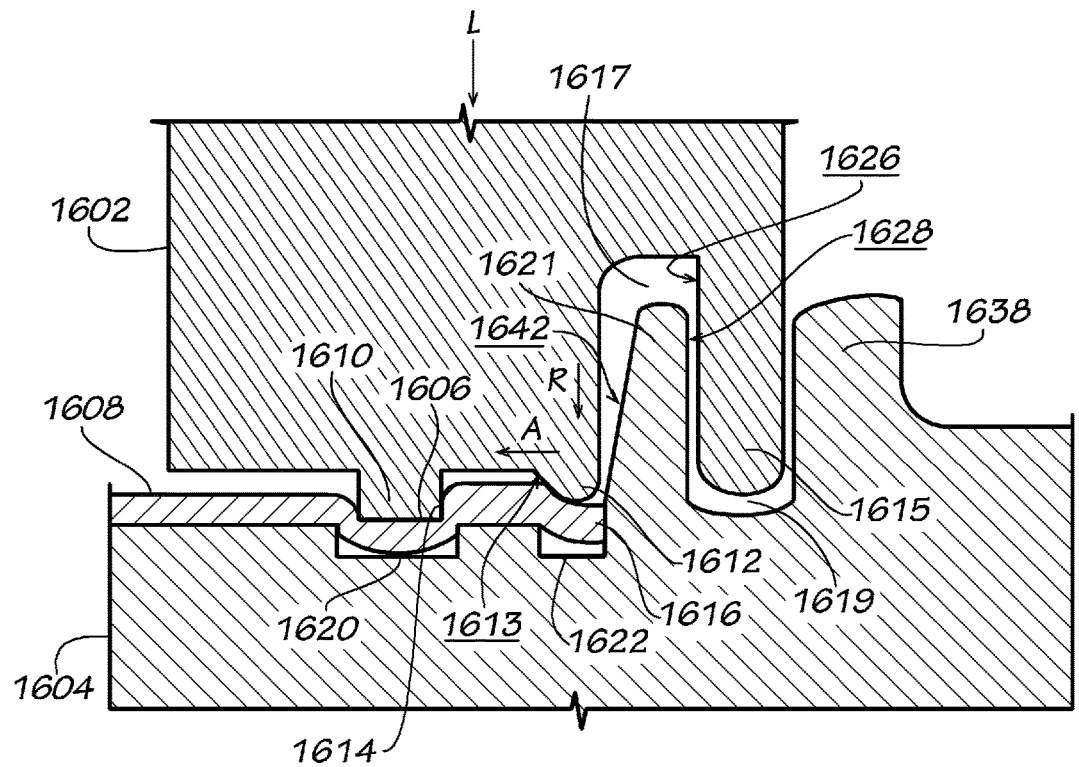
FIG. 16 is a cut away view of a device for rolling a groove in a pipe.

In certain embodiments, the pips ends are given a groove prior to assembly. Such grooves and a device to create such grooves can be found in U.S. Pat. No. 6,196,039, herein incorporated in its entirety. FIG. 16 shows an embodiment of a grove roller. Outside and inside rollers 1602, 1604 are used to form an inward groove 1606 near an end 1616 of pipe 1608. A peripheral surface of outside roller 1602 includes a first protrusion 1610 for creating groove 1606, and a second protrusion 1612, which is positioned closer to pipe end 1616 than protrusion 1610 when forming groove 1606. A peripheral surface of inside roller 1604 includes a first indentation or grooving notch 1620 configured to receive first protrusion 1610, and which acts with first profusion 1610 of top roller 1602 to form groove 1606. Inside roller also includes a second indentation or notch 1622 configured to receive the second protrusion, and which provides space for pipe end 1616.

Second protrusion 1612 is configured to help increase the height of a wall edge 1614 of groove 1606 and to resist flaring of pipe end 1616. Second protrusion 1612 includes a chamfered surface 1613 facing toward first protrusion 1610, and is rounded at the top and towards the opposite side.

Chamfered surface is at an angle $\beta$ from a perpendicular to the rotational axis of outside roller 1602, which can be in a range of about 0° to about 70°.

When a radial load, L, is applied to outside roller 1602, it is believed that protrusion 1612 applies a radial load, R, and an axial load, A, to pipe and 1616. The axial load tends to push the pipe material toward protrusion 1610; This action produces a higher groove edge wall 1614 than typical with a conventional outside roller (e.g., an outside roller without a protrusion 1612). Groove edge wall 1614 is formed with a substantially vertical face 225, which intersects an adjacent arcuate portion 1630 having a tangent at an intersection angle d to the vertical face 1625. It is believed that protrusion 1612 with chamfered surface 1613 tends to minimize intersection angle d, which helps to minimize shearing of the groove wall. A small intersection angle d provides a steeper groove edge wall 1614. This is advantageous because it improves the attachment of the pipe to the coupling, increasing the pressure rating of the joint and the ability of the joint to resist bending.

The radial load R applied to pipe 1608 by protrusion 1612 also acts to resist flaring of pipe end 1616, tending to keep pipe end 1616 more parallel with the central axis of pipe 1608. Reduced flaring is advantageous because it improves the go sealing of a gasket against the pipe. Protrusion 1612 produces a small secondary groove 1638 having a rounded profile.

Outside roller 1602 and inside roller 1604 each include a respective aligning element configured to interact with the other aligning element to align the outside and inside rollers when forming the groove. Outside roller 1602 has an alignment bead 1615, which appears as a finger in profile, and an alignment slot 1617. Inside roller 1604 includes a corresponding mating alignment slot 1619 which is configured to receive alignment bead 1615. Alignment slot 1619 is provided between facing walls of inboard and outboard alignment beads 1621, 1623, which also appear as fingers in profile. Alignment slot 1617 of outside roller 1602 is configured to receive alignment bead 1621. Alignment bead 1615 has a diameter which is less than the diameter of either protrusion 1610 or protrusion 1612. Slot 1617 extends well into outside roller 1602. Outside roller 1602 tends to screw out when roll forming groove 1606 on pipe 1608. Therefore, an alignment surface 1626 on alignment bead 1615 that faces protrusion 1610 contacts a second alignment surface 1628 on alignment bead 1621. This maintains alignment, of outride roller 1602 with inside roller 1604.

In operation, pipe 1608 is positioned by the operator against a pipe abutment surface 1642 of protrusion 1621 of inside roller 1604. Outside roller 1602 is brought down (arrow, L) by a manually operated hydraulic actuator (not shown) to form groove 1606. A pipe stand (not shown) can be used to support pipe 1608 during groove rolling. Positioning rollers provide an offset angle as described in Chatterley et al. U.S. Pat. No. 5,570,603. Positioning the pipe with an offset ankle causes outside roller 1602 to produce a torque which tends to draw pipe 1608 inward between the rollers 1602, 1604, thus restricting pipe 1608 from spiraling cut. Positioning rollers, along with the weight of pipe 1608, also act to resist a tendency of pipe 1608 to lift off the support during groove rolling.

In certain embodiments, the gasket is lubricated before assembly of the coupling. Any lubrication can be used, including but not limited to, oils, fats, synthetic lubricants, and silicon oil. In other embodiments, the lubrication is applied to the pipes before insertion into the gasket.

In certain embodiments, the lower housing and bolts are replaced with one u-bolt that is secured to the upper housing at each end thereof. The u-bolt can be made of any material including, plastic, metal, fiber, and synthetic materials.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only with the true scope and spirit of the invention indicated by the following claims. Furthermore, the term "comprising of" includes the terms "consisting of" and "consisting essentially of."

The invention claimed is:

1. A coupling for joining a first pipe and a second pipe, the coupling comprising:
    an upper housing comprising a first key at a first axial end configured to engage within a groove of the first pipe and a second key at a second axial end configured to engage within a groove of the second pipe;
    a lower housing comprising a first key at a first axial end configured to engage within the groove of the first pipe and a second key at a second axial end configured to engage within the groove of the second pipe;
    at least one fastening device coupling the upper housing to the lower housing; and
    a gasket positioned within the upper and lower housings, the gasket including
        two primary seals, each primary seal formed on an outer edge of the gasket, and a rib protruding from an inner surface of the gasket and between the two primary seals, the rib defining a sealing surface contactable with an exterior surface of the first pipe when the first key of each of the upper housing and the lower housing is engaged within the groove of the first pipe and the second key of each of the upper housing and the lower housing is engaged within the groove of the second pipe,
        wherein the sealing surface defines a first axially outer edge and a second axially outer edge,
        wherein the rib further defines a cylindrical section facing radially inward, the cylindrical section being cylindrical when the at least one fastening device is in an untightened condition, the cylindrical section defined between the first axially outer edge and the second axially outer edge,
        wherein the rib further comprises a secondary seal, the secondary seal configured to contact the exterior surface of the first pipe and the exterior surface of the second pipe when the first pipe and the second pipe are joined end-to-end,
    the coupling adapted to slide over the first pipe such that the at least a portion of the first pipe extends axially beyond each outer edge of the gasket while the coupling remains in an assembled state, the coupling further adapted to join and seal the first pipe and the second pipe while the coupling remains in an assembled state.

2. The coupling of claim 1, wherein an innermost diameter of the gasket is larger than an outer diameter of the first pipe and the second pipe when the at least one fastening device is in an untightened condition.

3. The coupling of claim 1, wherein each primary seal includes a gripping extension.

4. The coupling of claim 1, wherein each primary seal has a rounded interior end.

5. The coupling of claim 1, wherein the cylindrical section covers a seam defined between the first pipe and the second pipe when the first pipe and the second pipe are joined end-to-end.

6. The coupling of claim 1, wherein an innermost diameter of the gasket is defined by the secondary seal, and wherein an inner diameter of the cylindrical section is greater than the innermost diameter of the secondary seal.

\* \* \* \* \*